(12) United States Patent
Kondo et al.

(10) Patent No.: US 7,925,407 B2
(45) Date of Patent: Apr. 12, 2011

(54) ADJUSTMENT METHOD FOR VEHICLE AUTOMATIC TRANSMISSION

(75) Inventors: Masami Kondo, Toyota (JP); Masaharu Tanaka, Toyota (JP); Takayuki Kawakami, Nagoya (JP); Naoto Moriya, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 702 days.

(21) Appl. No.: 11/898,431

(22) Filed: Sep. 12, 2007

(65) Prior Publication Data

US 2008/0071449 A1  Mar. 20, 2008

(30) Foreign Application Priority Data

Sep. 15, 2006  (JP) ................................ 2006-251843

(51) Int. Cl.
  *G06F 7/00* (2006.01)
(52) U.S. Cl. ................ 701/51; 701/52; 701/53; 701/67; 701/68; 477/34; 477/143; 477/156; 477/159; 477/154; 475/123; 475/125; 475/127; 475/129; 475/120
(58) Field of Classification Search ............. 701/51, 701/52, 53, 67, 68; 475/123, 125, 127, 129, 475/120; 477/34, 143, 156, 159, 154, 109, 477/127, 110, 120
See application file for complete search history.

(56) References Cited

U.S. PATENT DOCUMENTS

| 5,931,885 | A  | * | 8/1999 | Kubo et al. ............... 701/51 |
| 6,616,561 | B2 | * | 9/2003 | Futamura ................. 475/123 |
| 7,090,614 | B2 | * | 8/2006 | Takagi ...................... 477/61 |
| 7,373,234 | B1 | * | 5/2008 | Hwang et al. ............. 701/60 |

FOREIGN PATENT DOCUMENTS

| JP | 11-125329 | 5/1999 |
| JP | 11-201314 | 7/1999 |
| JP | 2001-502405 | 2/2001 |
| JP | 2003-14119 | 1/2003 |
| JP | (A) 2004-212182 | 7/2004 |
| JP | (A) 2004-286062 | 10/2004 |
| JP | 2004-325404 | 11/2004 |
| JP | 2005-106131 | 4/2005 |
| JP | 2005-155920 | 6/2005 |
| JP | 2006-114525 | 4/2006 |

OTHER PUBLICATIONS

Japanese Office Action dated Aug. 11, 2008.

* cited by examiner

*Primary Examiner* — Mark Hellner
*Assistant Examiner* — Redhwan Mawari
(74) *Attorney, Agent, or Firm* — Finnegan, Henderson, Farabow, Garrett & Dunner, LLP

(57) ABSTRACT

The adjustment method includes an estimation step in which valve characteristics of the linear solenoid valves fitted to the hydraulic control circuit are measured, and estimated linear valve characteristics of the linear solenoid valves in isolation state are estimated based on the measured valve characteristics using predetermined correlations; and a correction value output step in which estimated linear piston-end pressures of the hydraulically-driven friction engagement elements immediately before the hydraulically-driven friction engagement elements are engaged are calculated based on the estimated linear valve characteristics, and the correction values that are applied to the control command values to adjust the drive currents supplied from the valve control unit to the linear solenoid valves are calculated based on differences between the estimated linear piston-end pressures and nominal piston-end pressures, and then output.

12 Claims, 10 Drawing Sheets

FIG.2

|      | C1 | C2 | C3 | C4 | B1 | B2  | F1 |
|------|----|----|----|----|----|-----|----|
| P    |    |    |    |    |    |     |    |
| REV1 |    |    | ○  |    |    | ○   |    |
| REV2 |    |    |    | ○  |    | ○   |    |
| N    |    |    |    |    |    |     |    |
| 1ST  | ○  |    |    |    |    | (○) | ○  |
| 2ND  | ○  |    |    |    | ○  |     |    |
| 3RD  | ○  |    | ○  |    |    |     |    |
| 4TH  | ○  |    |    | ○  |    |     |    |
| 5TH  | ○  | ○  |    |    |    |     |    |
| 6TH  |    | ○  |    | ○  |    |     |    |
| 7TH  |    | ○  | ○  |    |    |     |    |
| 8TH  |    | ○  |    |    | ○  |     |    |

○ : APPLICATION

NOMINAL V/B VALVE CHARACTERISTICS

ADJUSTMENT METHOD FOR VEHICLE AUTOMATIC TRANSMISSION

INCORPORATION BY REFERENCE

The disclosure of Japanese Patent Application No. 2006-251843 filed on Sep. 15, 2006 including the specification, drawings and abstract is incorporated herein by reference in its entirety.

BACKGROUND OF THE INVENTION

1. Field of the Invention

The invention relates to an adjustment method for a vehicle automatic transmission that includes a hydraulic control circuit including linear solenoid valves that control the pressures supplied to hydraulically-driven friction engagement elements, and a valve control unit that outputs the drive currents to drive the linear solenoid valves. More specifically, the invention relates to an adjustment method for calculating correction values that are applied to the control command values used to adjust the drive currents so that the correlations between the drive currents supplied to the linear solenoid valves and the effective pressures exhibit nominal characteristics.

2. Description of the Related Art

There is an automatic transmission test system that includes a component tester that detects the characteristic values of components which form a vehicle automatic transmission before assembly of the vehicle automatic transmission is completed; a storage medium that stores the characteristic values detected by the component tester, and a finished-product test device that tests the fully-assembled automatic transmission using the characteristic values stored in the storage medium.

With the automatic transmission test system, the characteristic values of the components that form the automatic transmission, the characteristic values of component assemblies each of which is an assembly of the components, and the characteristic values of assemblies of the component assemblies are measured by the component tester and a component assembly tester. Corrections are then made to the characteristic values if needed, and the characteristic values or the correction values are stored in the storage medium. During the finished-product testing step, the fully-assembled automatic transmission is tested based on the characteristic values of the automatic transmission stored in the storage medium.

A conventional vehicle automatic transmission test system is described in, for example, Japanese Patent Application Publication No. 2004-212182 (JP-S-2004-212182). In the described vehicle automatic transmission test system, the output pressure SLS (Kpa) output from the same linear solenoid valve are measured a predetermined number of times, and the average value thereof is used as the measured value. Then, the deviation of the measured value from the median of the output pressures SLS output from the linear solenoid valve according to the PPC standard is calculated, and the deviation is used as the hydraulic pressure correction data. However, in such conventional vehicle automatic transmission test system, changes in the characteristic values such as pressure loss that may occur while the output pressure output from the linear solenoid valve passes through a hydraulic control circuit, a connection sealing, etc. and finally becomes the engagement pressure used to engage a friction engagement element, namely, the supply pressure, are not taken into account. For example, if the pressure difference between the output pressure and the pressure detected at a hydraulic pressure detection portion is used as the pressure difference between the output pressure and the supply pressure supplied to the hydraulically-driven friction engagement element, correction errors may occur. Even if corrections are appropriately made to compensate for the variations in the valve characteristics of the linear solenoid valves, the variations in the characteristics of the hydraulically-driven friction engagement elements, particularly, the variations in the pressures at which engagement of the hydraulically-driven friction engagement elements is started (piston-end pressures) are not taken into account. Therefore, the torques that are transferred by the hydraulically-driven friction engagement elements are not accurately controlled, which may cause inconveniences, for example, torque shock may be caused when the hydraulically-driven friction engagement element is engaged, namely, shift shock may be caused in the automatic transmission.

In the hydraulically-driven friction engagement elements, even if the same hydraulic fluid pressure is supplied to the hydraulically-driven friction engagement elements, the hydraulically-driven friction engagement elements are not engaged in the same manner and the pressures at which engagement of the hydraulically-driven friction engagement elements is started vary due to the variations in the moving resistance of the pistons and the variations in the return springs. Accordingly, even if the hydraulic control is executed with the variations in the valve characteristics of the linear solenoid valves taken into account, torque shock may be caused when the hydraulically-driven friction engagement elements are engaged, namely, the shift shock may be caused in the automatic transmission. In the hydraulic control for the vehicle automatic transmission, it is also important to take the variations in the engagement/disengagement characteristics of the hydraulically-driven friction engagement elements into account.

SUMMARY OF THE INVENTION

The invention provides an adjustment method for a vehicle automatic transmission, which makes it possible to accurately control the torque that is transferred by hydraulically-driven friction engagement elements and to appropriately suppress shift shock caused in the automatic transmission regardless of the variations in the engagement/disengagement characteristics of the hydraulically-driven friction engagement elements.

An aspect of the invention relates to an adjustment method for a vehicle automatic transmission that is provided with a hydraulic control circuit including linear solenoid valves which control the supply pressures that are supplied to hydraulically-driven friction engagement elements; and a valve control unit that outputs the drive currents to drive the linear solenoid valves. The adjustment method is used to calculate the correction values that are applied to the control command values used to adjust the drive currents so that the correlations between the drive currents and effective pressures exhibit nominal characteristics. The adjustment method includes an estimation step, and a correction value output step. In the estimation step, the valve characteristics of the linear solenoid valves when the linear solenoid valves are fitted to the hydraulic control circuit are measured, and the estimated linear valve characteristics of the linear solenoid valves in the isolation state are estimated based on the measured valve characteristics using the predetermined correlations. In the correction value output step, the estimated linear piston-end pressures of the hydraulically-driven friction engagement elements immediately before the hydraulically-driven friction engagement elements are engaged are calculated based on the estimated linear valve characteristics, and the correction values that are applied to the control command values to adjust the drive currents supplied from the valve control unit to the linear solenoid valves are calculated based on the differences between the estimated linear piston-end pressures and nominal piston-end pressures, and then output.

The adjustment method includes (a) the estimation step in which the valve characteristics of the linear solenoid valves when the linear solenoid valves are fitted to the hydraulic control circuit are measured, and the estimated linear valve characteristics of the linear solenoid valves in the isolation state are estimated based on the measured valve characteristics using the predetermined correlations; and (b) the value output step in which the estimated linear piston-end pressures of the hydraulically-driven friction engagement elements immediately before the hydraulically-driven friction engagement elements are engaged are calculated based on the estimated linear valve characteristics, and the correction values that are applied to the control command values to adjust the drive currents supplied from the valve control unit to the linear solenoid valves are calculated based on the differences between the estimated linear piston-end pressures and nominal piston-end pressures, and then output. Accordingly, corrections are made to compensate for not only the variations in the valve characteristics of the linear solenoid valves but also the variations in the engagement/disengagement characteristics of the hydraulically-driven friction engagement elements. As a result, it is possible to accurately control the torque that is transferred by the hydraulically-driven friction engagement elements and to appropriately suppress shift shock caused in the automatic transmission regardless of the variations in the engagement/disengagement characteristics of the hydraulically-driven friction engagement elements.

BRIEF DESCRIPTION OF THE DRAWINGS

The features, advantages thereof, and technical and industrial significance of this invention will be better understood by reading the following detailed description of example embodiments of the invention, when considered in connection with the accompanying drawings, in which:

FIG. 2 is the operation chart showing the correlation between the gears of the vehicle automatic transmission in FIG. 1 and the engagement/disengagement states of hydraulically-driven friction engagement elements;

DETAILED DESCRIPTION OF THE EXAMPLE EMBODIMENTS

In the following description and the accompanying drawings, the present invention will be described in more detail with reference to example embodiments.

Figure 1:
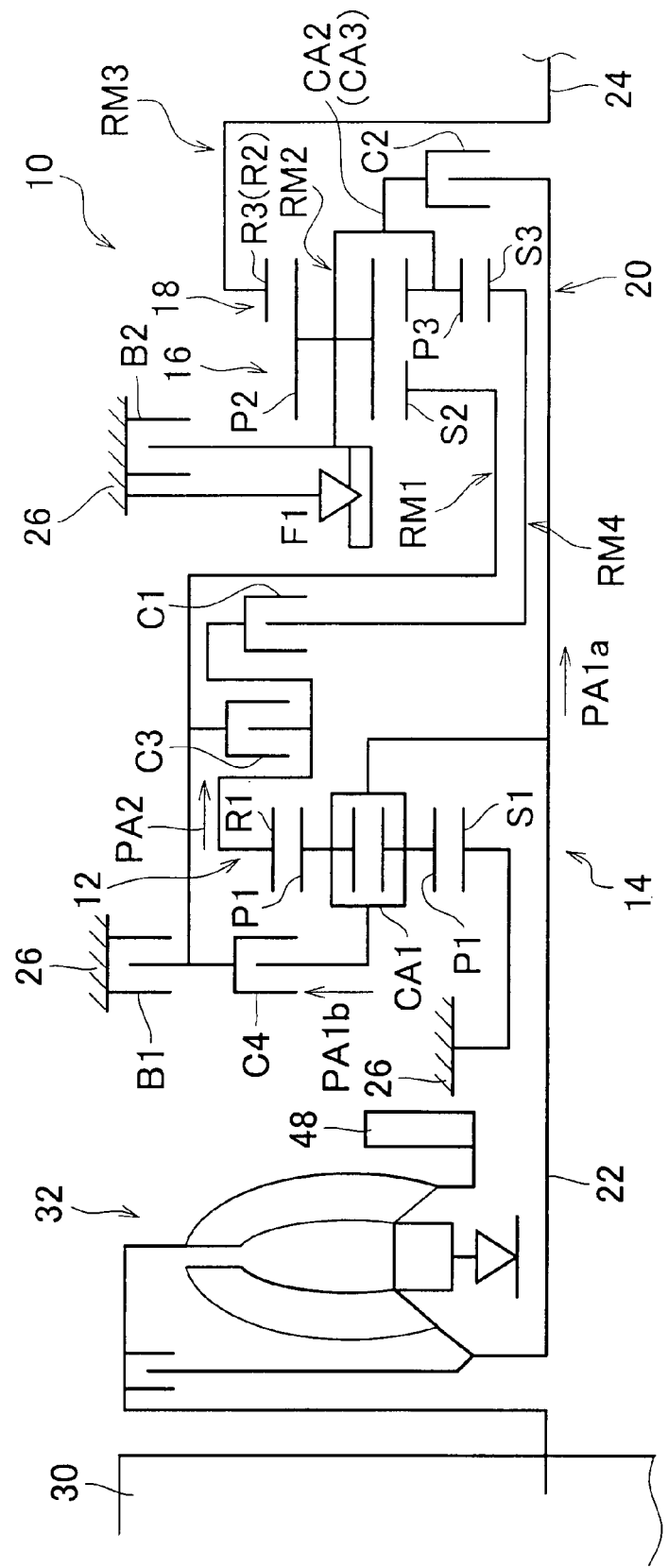
FIG. 1 is the view schematically showing a vehicle automatic transmission to which an adjustment method according to a first embodiment of the invention is applied.

A first embodiment of the invention will now be described. FIG. 1 is the view schematically showing the structure of a vehicle automatic transmission (hereinafter, referred to as an "automatic transmission") 10 to which an adjustment method according to the invention is applied. FIG. 2 is the operation chart illustrating the correlation between the engagement/disengagement states of hydraulically-driven friction engagement elements and multiple gears of the automatic transmission 10. The automatic transmission 10 has a first shift portion 14, which is formed mainly of a first planetary gear set 12 of a double pinion type, and a second shift portion 20, which is formed mainly of a second planetary gear set 16 of a single pinion type and a third planetary gear set 18 of a double pinion type. The first shift portion 14 and the second shift portion 20 are coaxially provided in a transmission case (hereinafter, referred to as a "case") 26 that is a non-rotational member fitted to a vehicle body. The automatic transmission 10 changes the speed of rotation transferred via an input shaft 22, and then outputs the rotation having a changed speed via an output shaft 24. The input shaft 22 functions as an input rotational member. In the first embodiment of the invention, the input shaft 22 is a turbine shaft of a torque converter 32 that is rotated by an engine 30, which is a drive power source that supplies drive power for propelling a vehicle. The output shaft 24 functions as an output rotational member. The rotation of the output shaft 24 is transferred through, for example, a differential gear unit (a final reduction gear unit) (not shown) and a pair of axles to turn right and left driving wheels. The automatic transmission 10 is substantially symmetric with respect to the axis thereof. Accordingly, the lower half of the automatic transmission 10 with respect to the axis is not shown in FIG. 1.

The first planetary gear set 12 includes a sun gear S1, multiple pairs of pinions P1 that mesh with each other, a carrier CA1 that supports the pinions P1 so that the pinions P1 can rotate on their axes and turn around the sun gear S1, and a ring gear R1 that meshes with the sun gear S1 via the pinions P1. Three rotational elements are formed by the sun gear S1, the carrier CA1, and the ring gear R1. The carrier CA1 is coupled with the input shaft 22, and rotated by the input shaft 22. The sun gear S1 is fixed to the case 26 so that the sun gear S1 cannot rotate. The ring gear R1 serves as an intermediate output member. The rotational speed of the ring gear R1 is made lower than that of the input shaft 22. The ring gear R1 transfers the rotation having a reduced speed to the second shift portion 20. In the first embodiment of the invention, the path, through which the rotation of the input shaft 22 is transferred to the second shift portion 20 without any speed change, is a first intermediate output path PA1 through which the rotation is transferred with a speed change at a predetermined constant speed ratio (=1.0). The first intermediate output path PA1 includes a direct passage PA1$a$, through which the rotation of the input shaft 22 is transferred to the second shift portion 20 without passing through the first planetary gear set 12; and an indirect passage PA1$b$, through which the rotation of the input shaft 22 is transferred to the second shift portion 20 through the carrier CA1 of the first planetary gear set 12. The path, through which the rotation of the input shaft 22 is transferred to the second shift portion 20 through the carrier CA1, the pinions P1 supported by the carrier CA1, and the ring gear R1 is a second intermediate output path PA2, through which the rotation of the input shaft 22 is transferred with a speed change at a speed ratio (>1.0) higher than the speed ratio used in the first intermediate output path PA1.

The second planetary gear set 16 includes a sun gear S2, pinions P2, a carrier CA2 that supports the pinions P2 so that the pinions P2 can rotate on their axes and turn around the sun gear S1, and a ring gear R2 that meshes with the sun gear S2 via the pinions P2. The third planetary gear set 18 includes a sun gear S3, multiple pairs of pinions P2 and P3 that mesh with each other, a carrier CA3 that supports the pinions P2 and P3 so that the pinions P2 and P3 can rotate on their axes and turn around the sun gear S3, and a ring gear R3 that meshes with the sun gear S3 via the pinions P2 and P3.

In the second planetary gear set 16 and the third planetary gear set 18, four rotational elements RM1 to RM4 are formed. More specifically, the first rotational element RM1 includes the sun gear S2 of the second planetary gear set 16, and the second rotational element RM2 includes the carrier CA2 of the second planetary gear set 16 that also serves as the carrier CA3 of the third planetary gear set 18. The third rotational element RM3 includes the ring gear R2 of the second planetary gear set 16 that also serves as the ring gear R3 of the third planetary gear set 18. The fourth rotational element RM4 includes the sun gear S3 of the third planetary gear set 18. The Ravigneaux-type gear train is formed in the second planetary gear set 16 and the third planetary gear set 18. More specifically, the same member serves as both the carriers CA2 and CA3, and the same member serves as both the ring gears R2 and R3. Also, the pinions P2 of the second planetary gear set 16 serve also as the second pinions of the third planetary gear set 18.

The automatic transmission 10 has hydraulically-driven friction engagement elements used to select one of multiple gears having different gear ratios. The hydraulically-driven friction engagement elements are a clutch C1, a clutch C2, a clutch C3, a clutch C4 (hereinafter, these clutches will be collectively referred to as "clutches C" when it is not necessary to make a distinction among these clutches), a brake B1, and a brake B2 (hereinafter, these brakes will be collectively referred to as "brakes B" when it is not necessary to make a distinction between these brakes). When the first rotational element RM1 (the sun gear S2) is coupled with the case 26 via the first brake B1, the rotation of the first rotational element RM1 is stopped. The first rotational element RM1 may be coupled with the ring gear R1 of the first planetary gear set 12, which is the intermediate output member, via the third clutch C3 (namely, the second intermediate output path PA2 may be formed). The first rotational element RM1 may be coupled with the carrier CA1 of the first planetary gear set 12 via the fourth clutch C4 (namely, the intermediate path PA1$b$ of the first intermediate output path PA1 may be formed). When the second rotational element RM2 (the carriers CA2 and CA3) is coupled with the case 26 via the second brake B2, the rotation of the second rotational element RM2 is stopped. The second rotational element RM2 may be coupled with the input shaft 22 via the second clutch C2 (namely, the direct path PA1$a$ of the first intermediate output path PA1 may be formed). The third rotational element RM3 (the ring gears R2 and R3) may be coupled with the output shaft 24 to output its rotation. The fourth rotational element RM4 (the sun gear S3) is coupled with the ring gear R1 via the first clutch C1. A one-way clutch F1 is provided in parallel with the second brake B2, at a position between the second rotational element RM2 and the case 26. The one-way clutch F1 permits normal rotation of the second rotational element RM2 (the rotation in the same direction in which the input shaft 22 rotates) while preventing reverse rotation of the second rotational element RM2.

FIG. 2 is the operation chart illustrating the correlation between the gears of the vehicle automatic transmission 10 and the engagement/disengagement states of the clutches C1 to C4 and the brakes B1 and B2. In the operation chart, a circle indicates that the element is engaged, and a circle with parentheses indicates that the element is engaged only when engine braking is applied, and a blank column indicates that the element is disengaged. Because the one-way clutch F1 is provided in parallel with the brake B2 that is used to select first gear "$1^{st}$", it is not necessary to engage the brake B2 when the vehicle starts (accelerates). The gear ratio of each gear is appropriately set based on the gear ratio $\rho1$ of the first planetary gear set 12, the gear ratio $\rho2$ of the second planetary gear set 16, and the gear ratio $\rho3$ of the third planetary gear set 18. The gear ratio $\rho$ is the ratio of the number of teeth of the sun gear to the number of teeth of the ring gear (gear ratio $\rho$=number of teeth of sun gear/number of teeth of ring gear).

As shown in FIG. 2, in the automatic transmission 10, when the first clutch C1 and the second brake B2 are engaged, first gear "$1^{st}$" having the highest gear ratio $\gamma$ (=rotational speed of input shaft 22/rotational speed of output shaft 24) is selected. When the first clutch C1 and the first bake B1 are engaged, second gear "$2^{nd}$" having the gear ratio $\gamma$ that is lower than that of first gear "$1^{st}$" is selected. When the first clutch C1 and the third clutch C3 are engaged, third gear "$3^{rd}$" having the gear ratio $\gamma$ that is lower than that of second gear "$2^{nd}$" is selected. When the first clutch C1 and the fourth clutch C4 are engaged, fourth gear "$4^{th}$" having the gear ratio $\gamma$ that is lower than that of third gear "$3^{rd}$" is selected. When the first clutch C1 and the second clutch C2 are engaged, fifth gear "$5^{th}$" having the gear ratio $\gamma$ that is lower than that of fourth gear "$4^{th}$" is selected. When the second clutch C2 and the fourth clutch C4 are engaged, sixth gear "$6^{th}$" having the gear ratio $\gamma$ (=1) that is lower than that of fifth gear "$5^{th}$" is selected. When the second clutch C2 and the third clutch C3 are engaged, seventh gear "$7^{th}$" having the gear ratio $\gamma$ that is lower than that of the sixth gear "$6^{th}$", is selected. When the second clutch C2 and the first brake B1 are engaged, eighth gear "$8^{th}$" having the gear ratio $\gamma$ that is lower than that of seventh gear "$7^{th}$" is selected.

When the third clutch C3 and the second brake B2 are engaged, first reverse gear "Rev1" having the highest gear ratio among the reverse gears is selected. When the fourth clutch C4 and the second brake B2 are engaged, second reverse gear "Rev2" having the gear ratio that is lower than that of the first reverse gear "Rev1" is selected.

Figure 3:
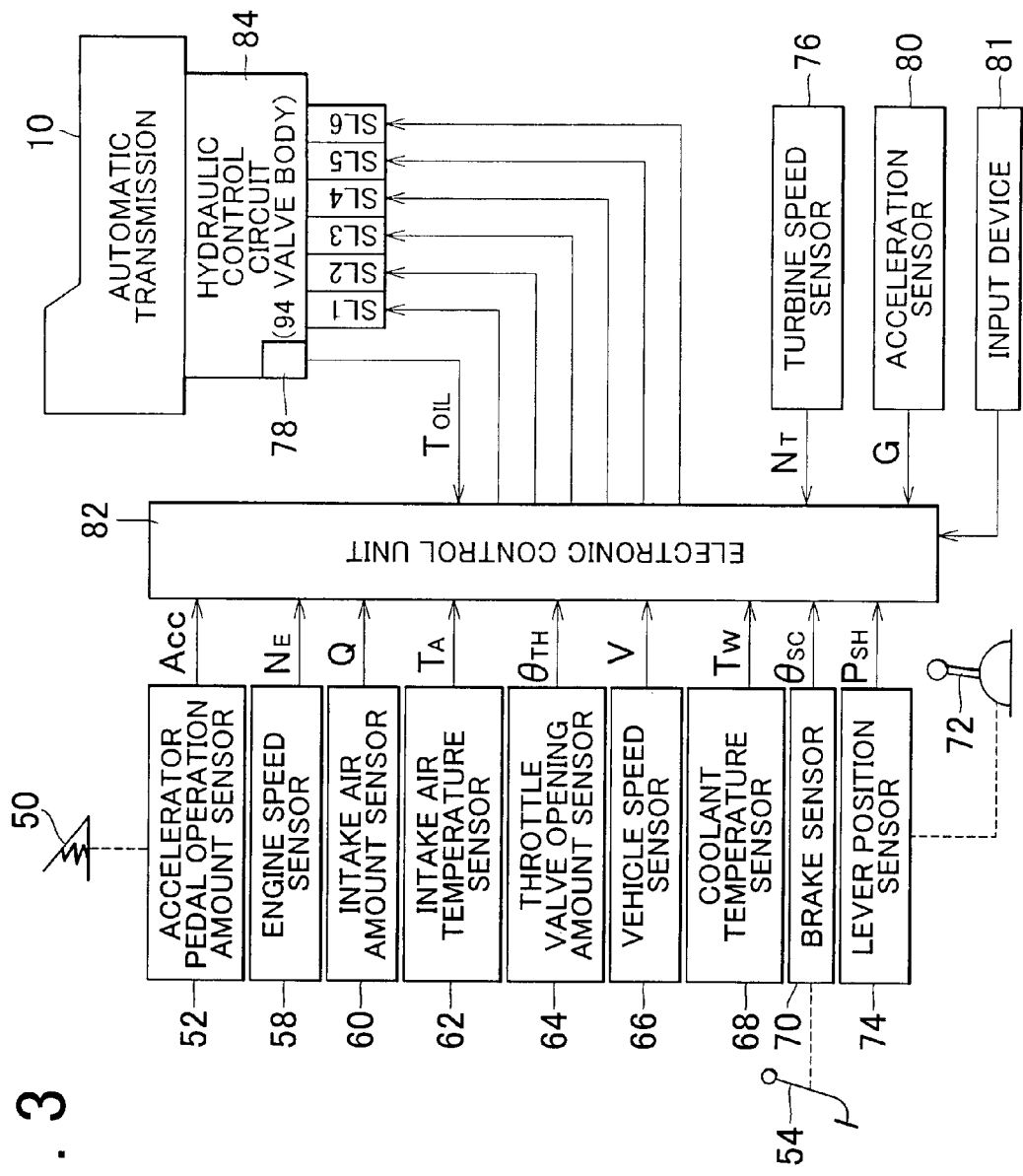
FIG. 3 is the block diagram showing the structure of a control system for a vehicle in which the automatic transmission in FIG. 1 is mounted.

FIG. 3 is the block diagram illustrating the main portion of a control system arranged in the vehicle to control the automatic transmission 10 in FIG. 1, etc. An electronic control unit (ECU) 82 for engine control and shift control, shown in FIG. 3, is formed of a so-called micro-computer that includes a CPU, RAM, ROM, an input interface, an output interface, etc. The electronic control unit (ECU) 82 executes signal processing according to the program stored in the ROM in advance while using the temporary storage function of the RAM to control the output from the engine 30 and the shifting operation of the automatic transmission 10. The electronic control unit (ECU) 82 may have an engine control unit, a shift control unit, etc. as independent functions, as needed.

In FIG. 3, the operation amount Acc of an accelerator pedal 50 is detected by an accelerator pedal operation amount sensor 52, and a signal indicating the accelerator pedal operation amount Acc is transmitted to the electronic control unit 82. Because the accelerator pedal 50 is depressed in accordance with the amount of acceleration which a driver intends to achieve, the accelerator pedal 50 functions as an accelerator operation member, and the accelerator pedal operation amount Acc corresponds to the amount of acceleration which the driver intends to achieve. A signal indicating the depression amount $\theta_{SC}$ of a brake pedal 54 of a footbrake, which is a regular brake, is transmitted to the electronic control unit 82. Because the brake pedal 54 is depressed in accordance with the amount of deceleration which the driver intends to achieve, the brake pedal 54 functions as a brake operation member, and the depression amount $\theta_{SC}$ corresponds to the amount of deceleration which the driver intends to achieve.

There are provided an engine speed sensor 58 that detects the speed $N_E$ of the engine 30, an intake air amount sensor 60 that detects the amount Q of air taken in the engine 30, an intake air temperature sensor 62 that detects the temperature $T_A$ of the intake air, an idle-switch-equipped throttle valve opening amount sensor 64 that determines whether an electronic throttle valve of the engine 30 is fully closed (in the idle state) and that detects, if it is determined that the electronic throttle valve is open, the opening amount $\theta_{TH}$ of the electronic throttle valve, a vehicle speed sensor 66 that detects the vehicle speed V (corresponding to the rotational speed $N_{OUT}$ of the output shaft 24), a coolant temperature sensor 68 that detects the temperature $T_W$ of a coolant for the engine 30, a brake sensor 70 that determines whether the brake pedal 54 has been operated and that detects, if it is determined that the brake pedal 54 has been operated, the depression amount $\theta_{SC}$ of the brake pedal 54, a lever position sensor 74 that detects the lever position (the position to which a shift lever 72 has been operated) $P_{SH}$ of the shift lever 72, a turbine speed sensor 76 that detects the turbine speed $N_T$ (=the rotational speed $N_{IN}$ of the input shaft 22), an AT (automatic transmission) oil temperature sensor 78 that detects the AT oil temperature $T_{OIL}$ that is the temperature of the hydraulic fluid in a hydraulic control circuit 84, an acceleration sensor 80 that detects the acceleration (deceleration) G of the vehicle, and an input device 81 such as a bar code reader, an infrared sensor, or a key. From these sensors and switches, signals indicating the accelerator pedal operation amount Acc, the engine speed $N_E$, the intake air amount Q, the intake air temperature $T_A$, the throttle valve opening amount $\theta_{TH}$, the vehicle speed V, the engine coolant temperature $T_W$, whether the brake has been operated and the brake pedal depression amount $\theta_{SC}$ (if the brake has been operated), the lever position $P_{SH}$ of the shift lever 72, the turbine speed $N_T$, the AT oil temperature $T_{OIL}$, the acceleration (deceleration) G of the vehicle, etc. are transmitted to the electronic control unit 82.

The electronic control unit 82 includes a shift control device 150, described later in detail, (see FIG. 8), as a function, that determines the gear that should be selected based on the actual vehicle speed V and the actual accelerator pedal operation amount Acc, using, for example, the correlation (indicated in the form of a map or a shift diagram), shown in FIG. 4, that is derived using the vehicle speed V and the accelerator pedal operation amount Acc as the parameters and stored in advance. The shift control device 150 then executes the shift control so that the determined gear is selected. For example, as the vehicle speed V decreases or the accelerator pedal operation amount Acc increases, the automatic transmission 10 is shifted to a lower gear having a higher gear ratio. In the shift control, the engagement/disengagement states of the clutches C and the brakes B are changed by controlling the excitation/non-excitation states of linear solenoid valves SL1 to SL6 arranged in the hydraulic control circuit 84 and controlling the electric currents supplied to the linear solenoid valves SL1 to SL6 so that the determined gear is selected. Also, the transient hydraulic pressures during the gear-change, etc. are controlled in the shift control. Namely, the engagement/disengagement states of the clutches C and the brakes B are changed by controlling the excitation/non-excitation states of the linear solenoid valves SL1 to SL6 so that one of the forward gears from first gear "$1^{st}$" to eighth gear "$8^{th}$" is selected. The shift control may be executed in various manners, for example, the shift control may be executed based on the throttle valve opening amount $\theta_{TH}$, the intake air amount Q, the road gradient, etc.

Figure 4:
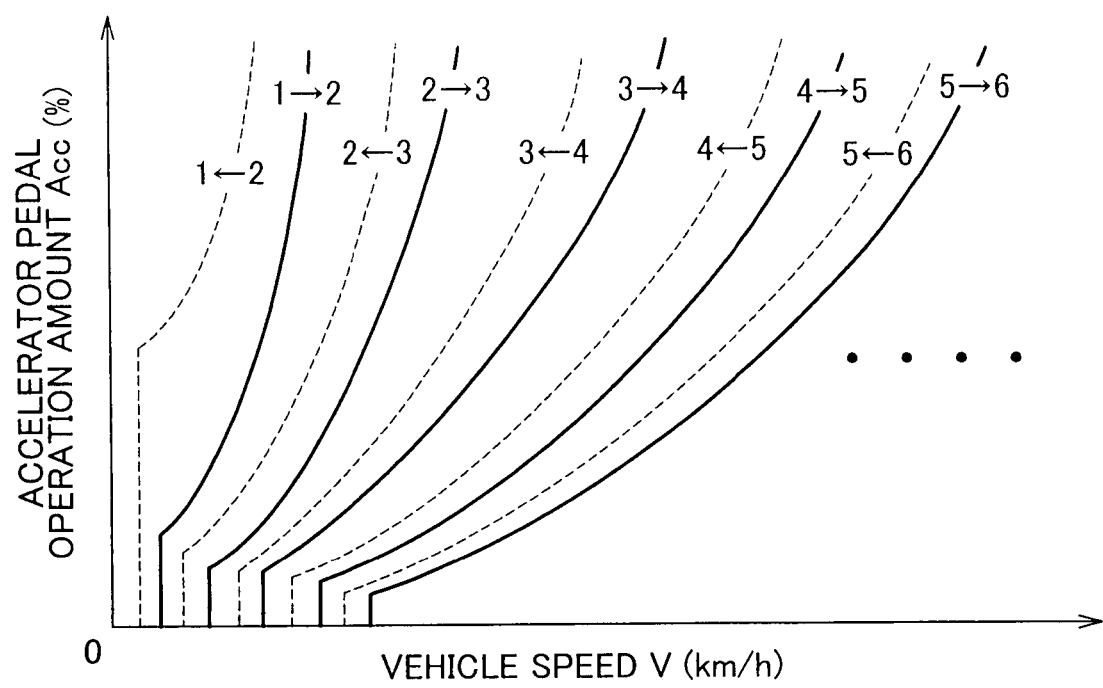
FIG. 4 is the shift diagram that is stored in advance and that is used in the shift control executed by an electronic control unit in FIG. 3.

In the shift diagram in FIG. 4, each solid line indicates the shift line (upshift line) used to determine whether the automatic transmission 10 should be shifted to a higher gear. Each broken line indicates the shift line (downshift line) used to determine whether the automatic transmission 10 should be shifted to a lower gear. Each shift line in the shift diagram in FIG. 4 is used to determine whether the point indicating the actual vehicle speed V correlated with the actual accelerator pedal operation amount Acc (%) has crossed the shift line, namely, whether the actual vehicle speed V has exceeded or fallen below the value $V_S$ which is on the shift line and at which the gears should be changed (shift-point vehicle speed). Each shift line is formed as a string of the values $V_S$, namely a string of shift-point vehicle speeds, and stored in advance. The shift diagram in FIG. 4 shows only the shift lines for first gear to sixth gear from among eight selectable gears of the automatic transmission 10.

Figure 5:
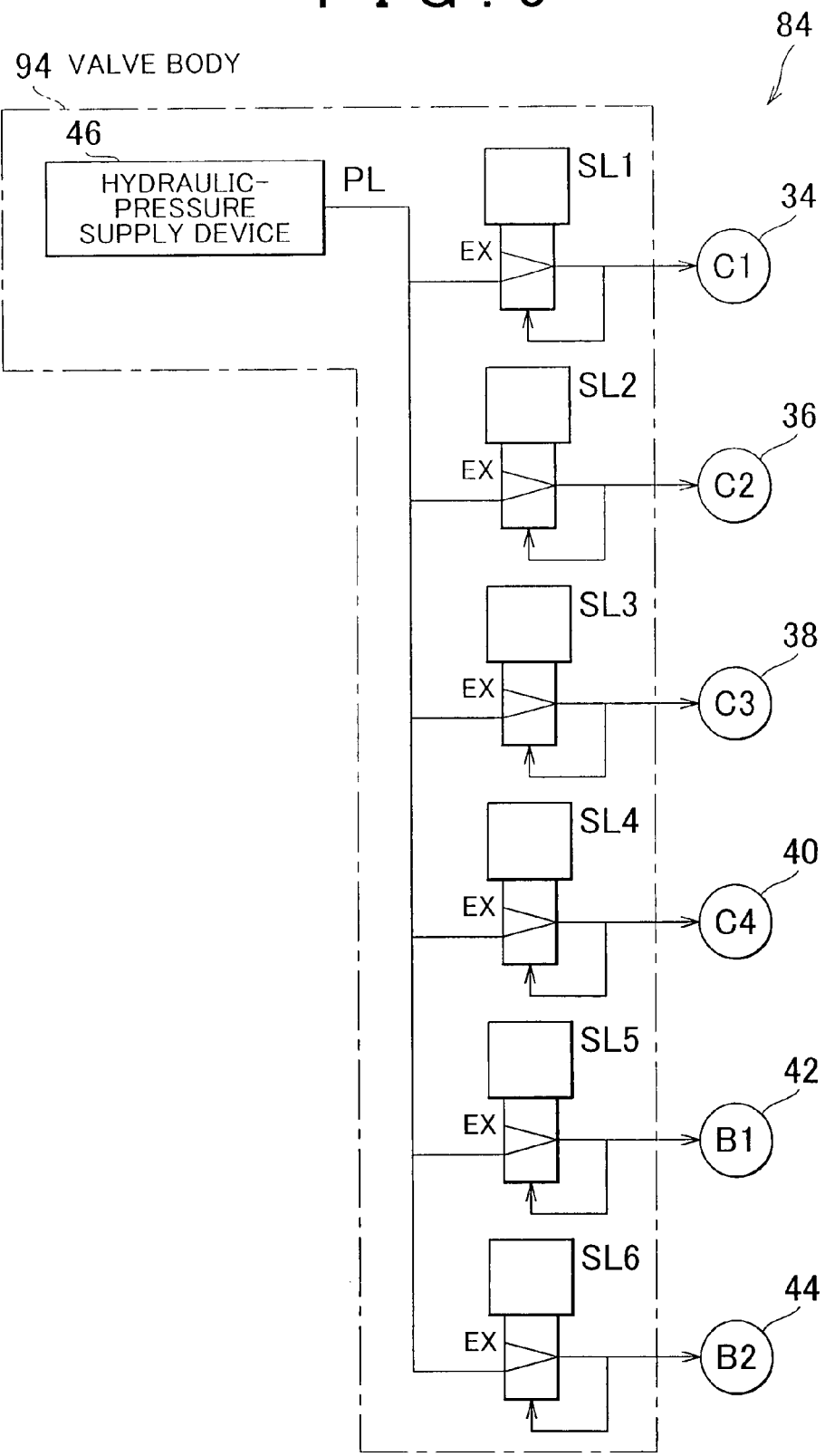
FIG. 5 is the diagram showing the main portion of a hydraulic control circuit for shifting arranged in the vehicle in which the automatic transmission in FIG. 1 is mounted.

FIG. 5 is the circuit diagram showing a portion of the hydraulic control circuit 84, which is used to control the hydraulic pressure supplied to each of the hydraulically-driven friction engagement elements, that are, the clutches C1 to C4 and the brakes B1 and B2. As shown in FIG. 5, the linear solenoid valves SL1, SL2, SL3, SL4, SL5, and SL6 are arranged in the hydraulic control circuit 84 according to the first embodiment of the invention, and correspond to a hydraulic actuator (hydraulic cylinder) 34 for the clutch C1, a hydraulic actuator (hydraulic cylinder) 36 for the clutch C2, a hydraulic actuator (hydraulic cylinder) 38 for the clutch C3, a hydraulic actuator (hydraulic cylinder) 40 for the clutch C4, a hydraulic actuator (hydraulic cylinder) 42 for the brake B1, and a hydraulic actuator (hydraulic cylinder) 44 for the brake B2, respectively. The D-range pressure (forward range pressure, forward hydraulic pressure) output from a hydraulic-pressure supply device 46, namely, the line pressure PL is adjusted by the linear solenoid valves SL1, SL2, SL3, SL4, SL5 and SL6 and then supplied to the hydraulic actuators 34, 36, 38, 40, 42 and 44, respectively. The main portion of the hydraulic control circuit 84 is arranged within a thick-plate-like valve body 94 that is fixed to the lower portion of the automatic transmission 10.

The hydraulic-pressure supply device 46 makes an adjustment to the original pressure, namely, the hydraulic pressure produced by a mechanical hydraulic pump 48 (see FIG. 1) that is driven by the engine 30, to produce the D-range pressure PL.

Figure 6:
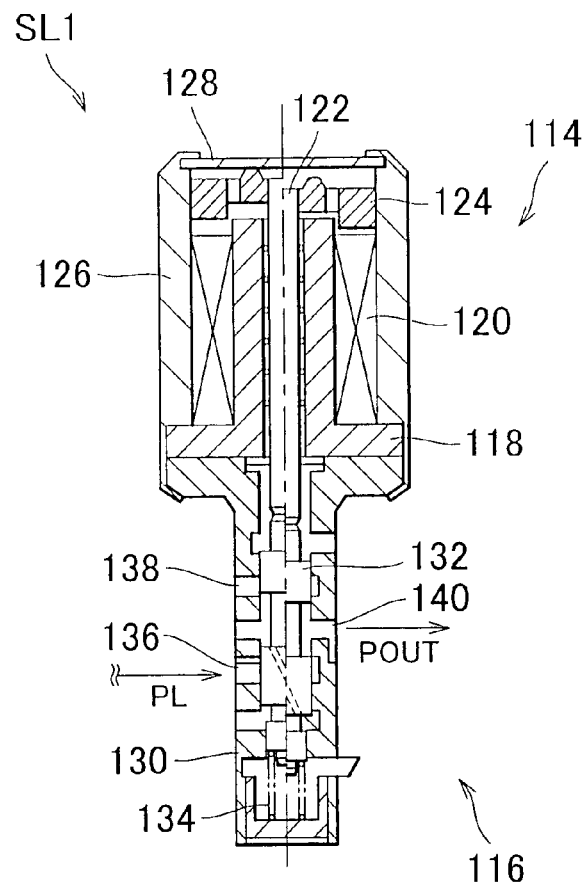
FIG. 6 is the cross-sectional view showing the structure of a linear solenoid valve that is provided in the hydraulic control circuit for shifting in FIG. 5, and that controls the pressure supplied to a hydraulically-driven friction engagement element.

FIG. 6 is the view illustrating the structure of each of the linear solenoid valves SL1 to SL6. Because the linear solenoid valve SL1 to SL6 arranged in the hydraulic control circuit 84 according to the first embodiment of the invention have basically the same structure, FIG. 6 shows the linear solenoid valve SL1 as an example. The linear solenoid valve SL1 is formed of a solenoid 114 which converts electric energy to drive power when being supplied with electric power, and a pressure adjustment portion 116 that makes an adjustment to the input pressure PIN (the D-range pressure PL in the linear solenoid valves SL1, SL2, SL3, SL4, SL5, and SL6) using the driving of the solenoid 114 to produce the predetermined output pressure PSL. The solenoid 114 includes a cylindrical core-tube 118; a coil 120 formed by winding a conductive wire around the core-tube 118; a core 122 that is arranged in the core-tube 118 so as to be movable in the axial direction of the linear solenoid valve SL1; a plunger 124 that is fixed to one end of the core 122, the one end being opposite to the pressure adjustment portion 116; a case 126 that houses the core-tube 118, the coil 120, the core 122 and the plunger 124; and a cover 128 that is fitted at the opening of the case 126. The pressure adjustment portion 116 includes a sleeve 130 that is fitted to the case 126; a spool valve element 132 that is provided in the sleeve 130 so as to be movable in the axial direction; and a spring 134 that biases the spool valve element 132 toward the solenoid 114. The solenoid 114-side end of the spool valve element 132 contacts the pressure adjustment portion 116-side end of the core 122. In the linear solenoid valve SL1 thus configured, when the drive current $I_{DR}$ is passed through the coil 120, the plunger 124 is moved, in accordance with the value of the drive current $I_{DR}$, in the direction of the axis common to the core 122 and the spool valve element 132. In accordance with the movement of the plunger 124, the core 122 is moved together with the spool valve element 132 in the axial direction. Thus, the flow amount of the hydraulic fluid flowing in the linear solenoid valve SL1 through an inlet port 136 and the flow amount of the hydraulic fluid discharged from the linear solenoid valve SL1 through a drain port 138 are adjusted. Thus, the line pressure PL input in the linear solenoid valve SL1 through the inlet port 136 is adjusted to the predetermined output pressure PSL corresponding to the drive current $I_{DR}$ based on the valve characteristic curve indicating the correlation between the drive current and the output pressure, for example, shown in FIG. 7. Then, the output pressure PSL is output from the linear solenoid valve SL1 through an output port 140.

Figure 8:
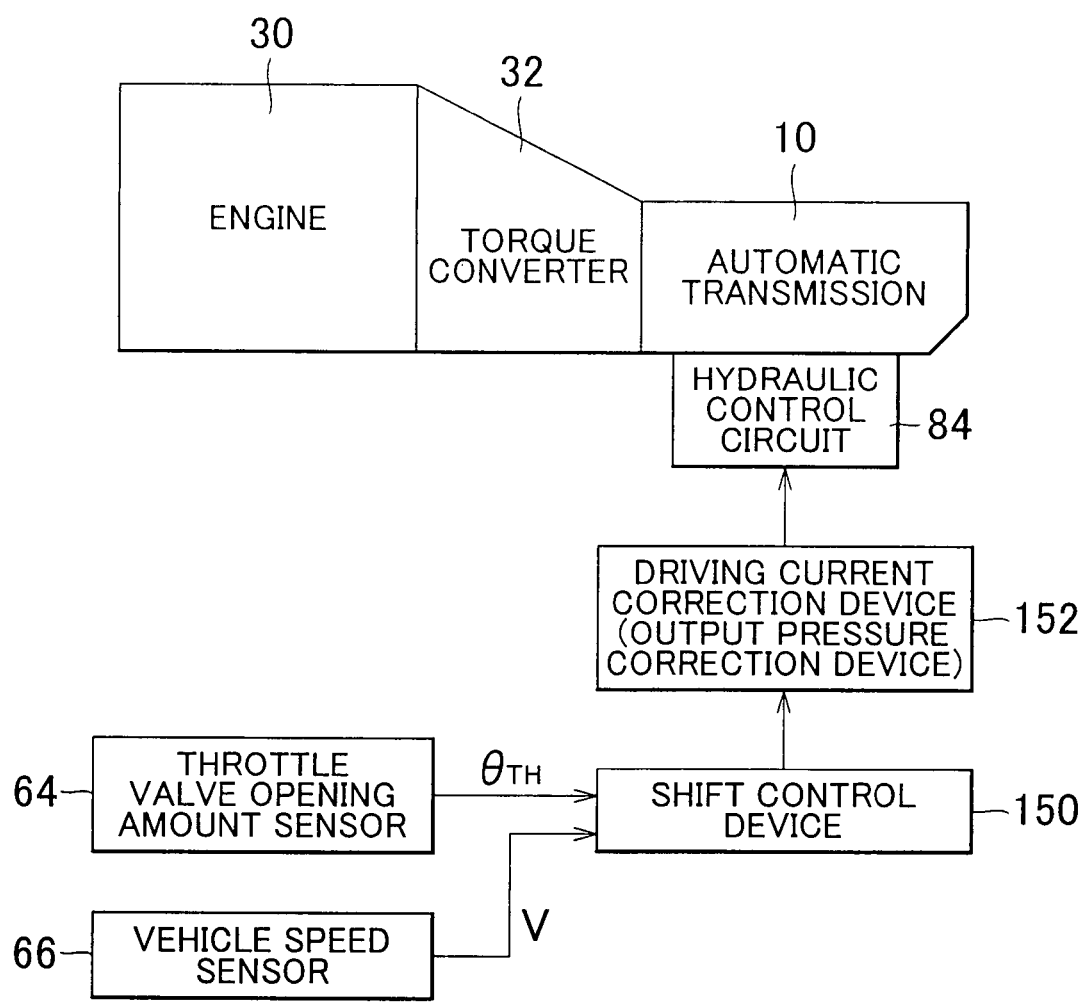
FIG. 8 is the functional block diagram showing the main portion of the shift control function of the electronic control unit in FIG. 3.

FIG. 8 is the functional block diagram illustrating the main portion of the control function of the electronic control unit 82. The shift control device 150 determines the gear that should be selected based on the actual vehicle speed V and the actual accelerator pedal operation amount Acc using the correlation, for example, shown in FIG. 4, that is derived using the vehicle speed V and the accelerator pedal operation amount Acc as the parameters and stored in advance (in the form of a map or a shift diagram). The shift control device 150 then executes the shift control to select the determined gear. In the shift control, the drive currents $I_{DR}$ are supplied to two linear solenoid valves SL that control the pressures supplied to two friction engagement elements, from among the multiple friction engagement elements (the clutches C and the brakes B), the two friction engagement elements contributing to the selection of the determined gear. The two friction engagement elements are the hydraulically-driven friction engagement element that should be disengaged and the hydraulically-driven friction engagement element that should be engaged. Thus, the hydraulically-driven friction engagement element that should be disengaged is disengaged and the hydraulically-driven friction engagement element that should be engaged is engaged in a predetermined manner. As described above, the electronic control unit 82 functions also as a valve control unit. For example, when it is determined that the automatic transmission 10 should be shifted from fourth gear to third gear (4→3), the electronic control unit 82 transmits a signal indicating the hydraulic pressure value $P_{SL4}$ or the drive current value $I_{DR4}$ corresponding to the hydraulic pressure value $P_{SL4}$ to the linear solenoid valve SL4 to disengage the clutch C4, and transmits a signal indicating the hydraulic pressure value $P_{SL3}$ or the drive current value $I_{DR3}$ corresponding to the hydraulic pressure value $P_{SL3}$ to the linear solenoid valve SL3 to engage the clutch C3.

An output pressure correction device 152, namely, a drive current correction device 152 corrects the control command values to make corrections to the hydraulic pressure values or the drive current values corresponding to the hydraulic pressure values, using the correlations R1 to R6 between the output hydraulic pressures P (or the drive currents $I_{DR}$ corresponding to the output hydraulic pressures P) of the linear solenoid valves SL1 to SL6 and the hydraulic pressure correction values ΔP (or the drive current correction values $ΔI_{DR}$ corresponding to the hydraulic pressure correction values ΔP) for the linear solenoid valves SL1 to SL6. The correlations R1 to R6 are derived and stored via the input device 81 in advance. The control command values are corrected to minimize the influence of the variations in the valve characteristics of the linear solenoid valves SL1 to SL6 and the variations in the engagement/disengagement characteristics of the hydraulically-driven friction engagement elements. The drive current correction device 152 then outputs the drive current values $I_{DR1}$ to $I_{DR6}$ derived through the correction to the linear solenoid valves SL1 to SL6, respectively. The correction values ΔP are set so that the linear solenoid valves SL1 to SL6 each exhibit predetermined nominal valve characteristic, and the valve characteristics of the linear solenoid valves SL1 to SL6 are converted, using the correction values ΔP, into the linear valve characteristics in the state where the linear solenoid valves SL1 to SL6 are not connected to the hydraulic control circuit 84 (hereinafter, such state will be referred to as the "isolation state"). In addition, the correction values ΔP are calculated so that each of the estimated linear piston-end pressures of the hydraulically-driven friction engagement elements in the pseudo-neutral state (i.e., the state in which a friction engagement element is half-engaged (a friction engagement element is made to slip by reducing the engagement force) while the vehicle is stopped at the D-range (or the R-range) and the difference in the engine speed and the turbine speed is maintained constant) equal to predetermined nominal piston-end pressure. The nominal valve characteristic may be fixed-target valve characteristic such as the average valve characteristic of the valve characteristics of several tens of linear solenoid valves SL on which actual measurements are performed, the median characteristic derived at the design stage, or the valve characteristic of a prototype standard. The nominal piston-end pressure may be a fixed-target value such as the average value of the piston-end pressures of the several tens of linear solenoid valves SL on which actual measurements are performed, the median derived at the design stage, or the piston-end pressure of the prototype standard.

Figure 12:
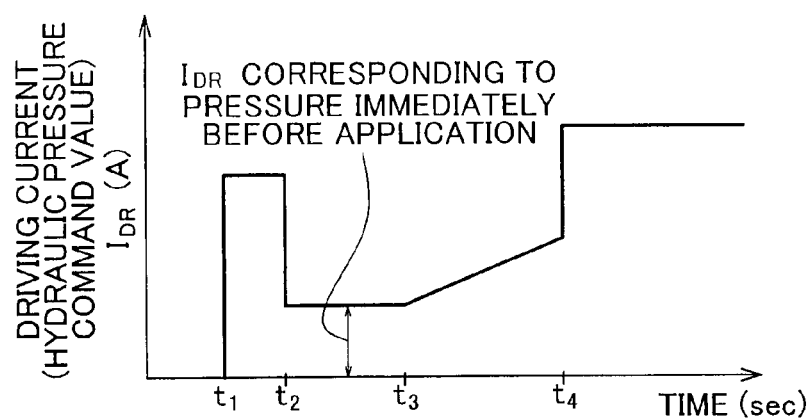
FIG. 12 is the time chart illustrating an example of the manner in which the drive current supplied to the linear solenoid valve in FIG. 6 changes to engage the hydraulically-driven friction engagement element during a gear-change.

FIG. 12 shows the manner in which the drive current $I_{DR}$ changes during the process of engaging a predetermined hydraulically-driven friction engagement element that should be engaged during a gear-change. After the drive current $I_{DR}$ is output at time $t_1$, the drive current $I_{DR}$ is abruptly increased to a high value and is maintained at the high value during the quick-engagement period until time $t_2$. Then, during the constantly-maintained pressure period until time $t_3$, the magnitude of the drive current $I_{DR}$ is maintained at a value at which the constantly-maintained pressure, which is the pressure immediately before engagement of the predetermined hydraulically-driven friction engagement element, is achieved. When the sweep period, during which the engagement torque is gradually increased, has elapsed since $t_3$, and a determination that the rotational speeds of the two rotational elements are equal to each other is made at time $t_4$, the drive current $I_{DR}$ is increased to the maximum value.

Figure 9:
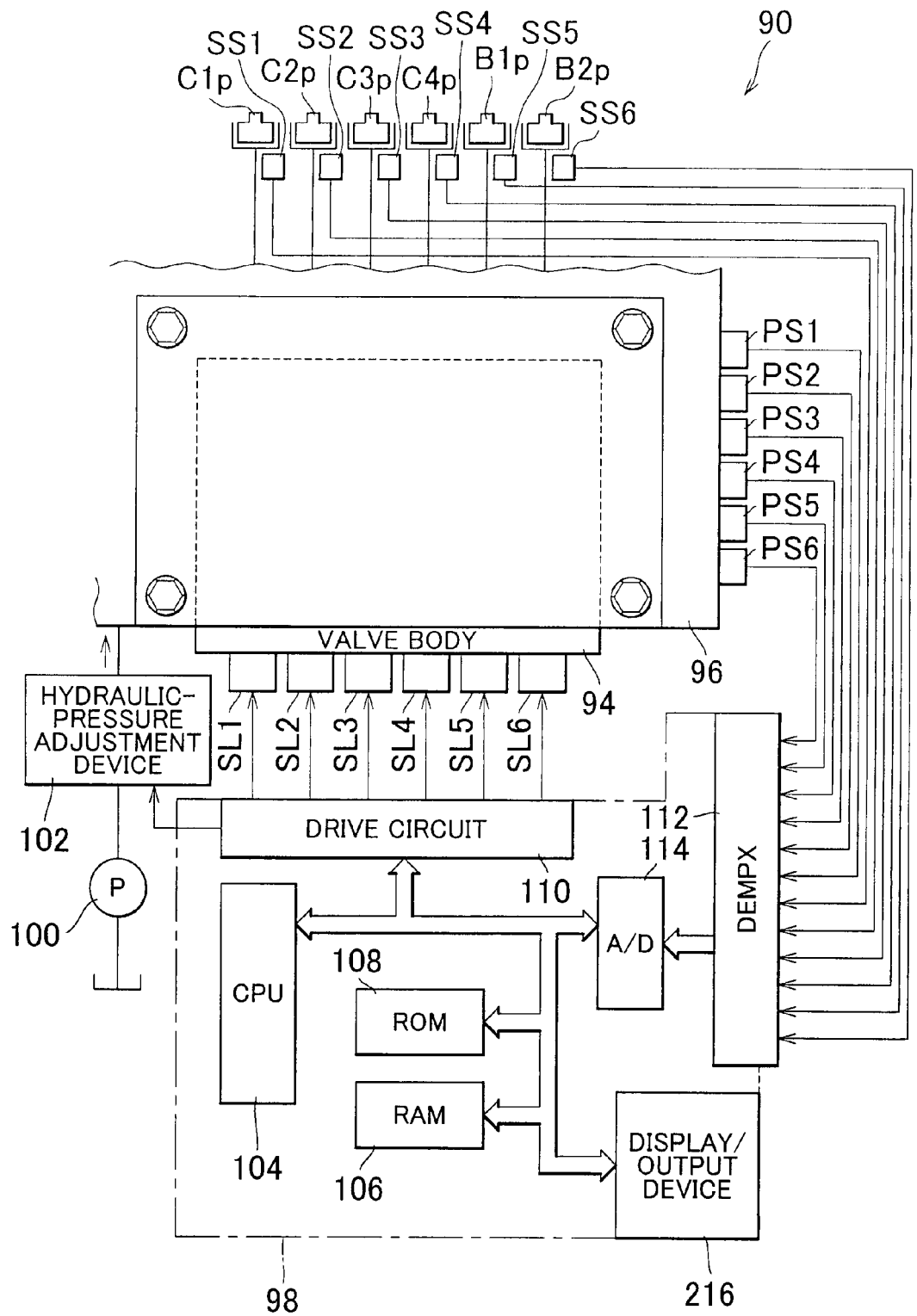
FIG. 9 is the view showing the structure of a test system that is installed in, for example, an automatic transmission assembly plant to derive the valve characteristic curves used to adjust the operations of the linear solenoid valves provided in the automatic transmission in FIG. 1, the valve characteristic curves being individually derived for each automatic transmission.

FIG. 9 is the view illustrating a test system (valve body tester) 90 that is installed in, for example, an automatic transmission assembly plant to derive the correlations R used to adjust the operations of the linear solenoid valves SL arranged within the automatic transmission 10. The correlations R are individually derived for each automatic transmission 10. As shown in FIG. 9, the test system 90 includes a test jig 96, pressure sensors SP1 to SP6, piston stroke sensors SS1 to SS6, and an electronic control unit 98. The valve body 94, in which the linear solenoid valves SL1 to SL6 and the main portion of the hydraulic control circuit 84 are arranged, is detachably fitted to the test jig 96. The pressure sensors SP1 to PS6 are connected to the test jig 96 to detect the output pressures output from the linear solenoid valves SL1 to SL6, respectively. The piston stroke sensors SS1 to SS6 are provided to detect the positions, to which pistons C1$p$, C2$p$, C3$p$, C4$p$, B1$p$ and B2$p$ of the hydraulically-driven friction engagement elements C1, C2, C3, C4, B1 and B2 have been moved. The pistons C1$p$, C2$p$, C3$p$, C4$p$, B1$p$ and B2$p$ are connected to the test jig 96. The electronic control unit 98 outputs the test drive currents $I_{DR1}$ to $I_{DR6}$ to the linear solenoid valves SL1 to SL6, and receives the signals indicating the values detected by the pressure sensors PS1 to PS6 and the piston stroke sensors SS1 to SS6. The test system 90 includes a hydraulic-pressure adjustment device 102 that adjusts the pressure of the hydraulic fluid sent, under pressure, from a hydraulic pump 100 to the valve body 94 according to a command from the electronic control unit 98.

The electronic control unit 98 for testing is formed of a so-called microcomputer including a CPU 104, RAM 106, ROM 108, a drive circuit 110 that is an output interface through which the drive currents $I_{DR1}$ to $I_{DR6}$ are output to the linear solenoid valves SL1 to SL6, respectively, a demultiplexer 112 that is an input interface through which the signals from the pressure sensors PS1 to PS6 and the piston stroke sensors SS1 to SS6 are received; an A/D (analog-digital) converter 214, a display/output unit 216, etc. The electronic control unit 98 executes signal processing using the temporary storage function of the RAM 106 and according to the programs stored in the ROM 108 in advance to operate the linear solenoid valves SL1 to SL6 in a predetermined manner, and derive the correlations R based on the output pressures $P_{SL1}$ to $P_{SL6}$ output from the linear solenoid valves SL1 to SL6 and the positions of the pistons of the clutches C and the brakes B.

Figure 10:
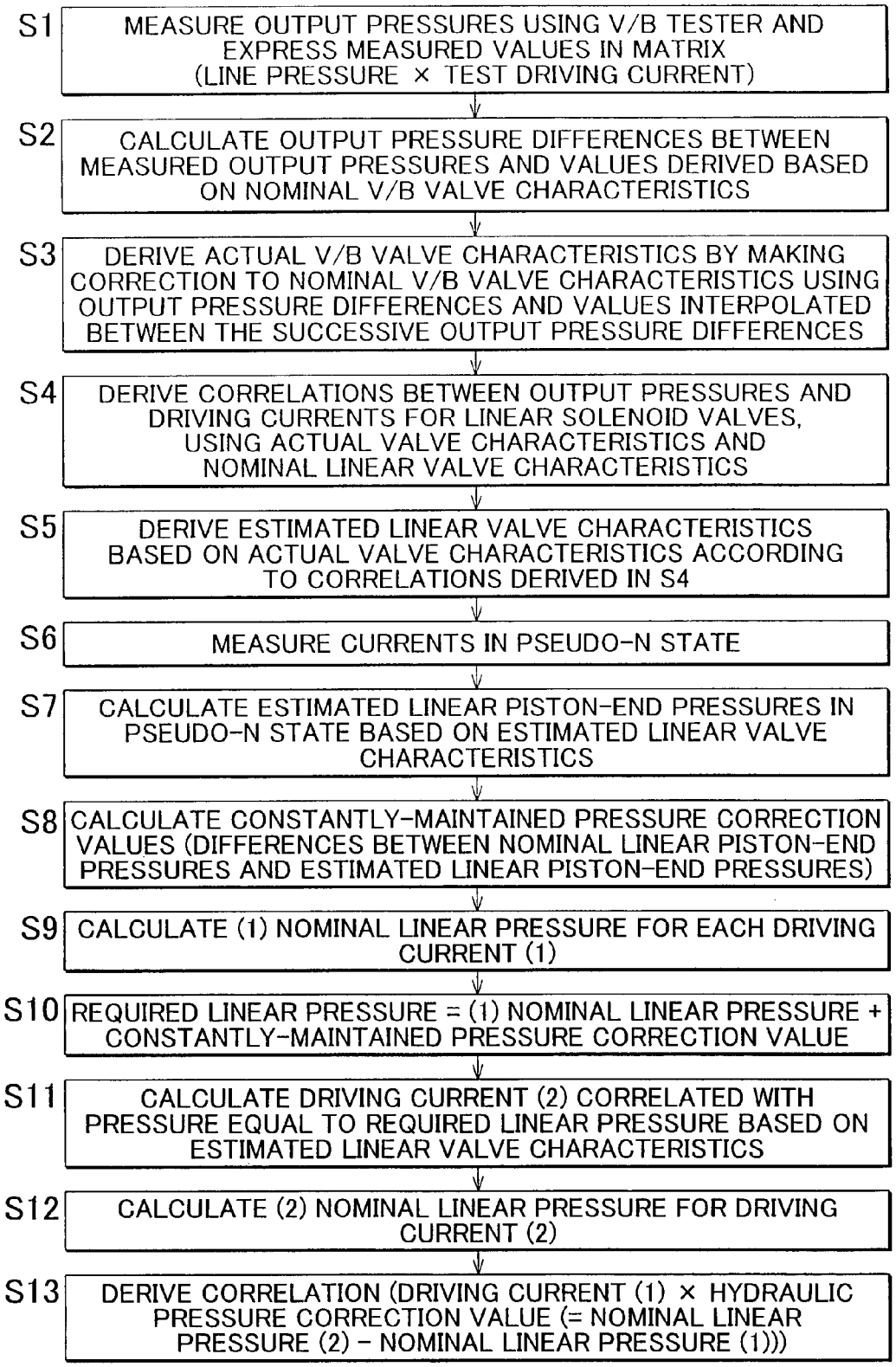
FIG. 10 is the flowchart showing the main portion of the operation executed by the test system in FIG. 9.

FIG. 10 is the flowchart that describes the main portion of the control executed by the electronic control unit 98 for testing. The control is executed to derive the correlations R between the output pressures P (or the drive currents $I_{DR}$ corresponding to the output pressures P) and the hydraulic pressure correction values ΔP (or the drive current correction values $\Delta I_{DR}$) for the linear solenoid valves SL1 to SL5 that control the clutches C1, C2, C3 and C4 and the brake B1, respectively, which are used to select the forward gears. However, the linear solenoid SL6 that controls the brake B2 used to select the reverse gear is not a target for this control.

In FIG. 10, steps S1 to S5 correspond to the estimation step or estimation device for estimating the estimated linear valve characteristic curves of the linear solenoid valves SL1 to SL5 in the isolation state. Steps S6 to S13 correspond to the correction value output step or correction value output device for calculating the correction values used to correct the control command values, based on which the drive currents $I_{DR}$ supplied to the linear solenoid valves SL1 to SL5 are generated, based on the constantly-maintained pressure correction values so that the correlations between the drive currents and the effective pressures (=engagement pressure−piston-end pressure) exhibit the nominal valve characteristic, and for outputting the calculated correction values.

First, in step S1 which is a measurement step, the pressure sensors PS1 to PS5 measure the output pressures PSL1 to PSL5 output from the linear solenoid valves SL1 to SL5, which are arranged in the valve body 94 detachably fitted to the test system 90, when predetermined five magnitudes of test currents IH1 to IH5 are sequentially supplied to each of the linear solenoid valves SL1 to SL5 in an ascending and descending stepwise manner while the higher original pressure PH of, for example, approximately 1500 Kpa is supplied to each of the linear solenoid valves SL1 to SL5 from the hydraulic-pressure adjustment device 102. Also, the pressure sensor PS1 to PS5 measure the output pressures PSL1 to PSL5 output from the linear solenoid valves SL1 to SL5 when predetermined multiple magnitudes of test currents IL1 to IL3 are sequentially supplied to each of the linear solenoid valves SL1 to SL5 in an ascending and descending stepwise manner while the lower original pressure PL of, for example, approximately 700 Kpa is supplied to each of the linear solenoid valves SL1 to SL5 from the hydraulic-pressure adjustment device 102. The measured values PHJ1 to PHJ5, and the measured values PLJ1 to PLJ3 are temporarily stored in the RAM 10. Based on these measured values, the valve characteristic curves (the actual V/B (valve body) valve characteristic curves), which indicate the correlations between the drive currents supplied to the linear solenoid valves SL1 to SL5 and the output pressures output from the linear solenoid valves SL1 to SL5 when the linear solenoid valves SL1 to SL5 are fitted to the valve body 94, are derived. The valve characteristic curves that indicate the correlations when the higher original pressure PH is supplied to each of the linear solenoid valves SL1 to SL5, and the valve characteristic curves that indicate the correlations when the lower original pressure PL is supplied to each of the linear solenoid valves SL1 to SL5 are derived. The measured value is set to the average value of the output pressures, which are obtained when the same magnitude of test currents are supplied to each of the linear solenoid valves SL1 to SL5, one of the test currents being supplied when the magnitude of electric current is ascending and the other test current being supplied when the magnitude of electric current is descending. The magnitudes of the test currents are set to the values between the minimum current value (zero) and the maximum rated current value at predetermined intervals. The magnitudes of the test currents IH1 to IL3 supplied while the lower original pressure is supplied to each of the linear solenoid valves SL1 to SL5 are the same as the magnitudes of the test currents IH1 to IH3 supplied while the higher original pressure is supplied to each of the linear solenoid valves SL1 to SL5. The magnitude of the test current IL1 (=IH1) is set to the minimum value among the values at which the output pressure PSL of the linear solenoid valve can be controlled.

Figure 7:
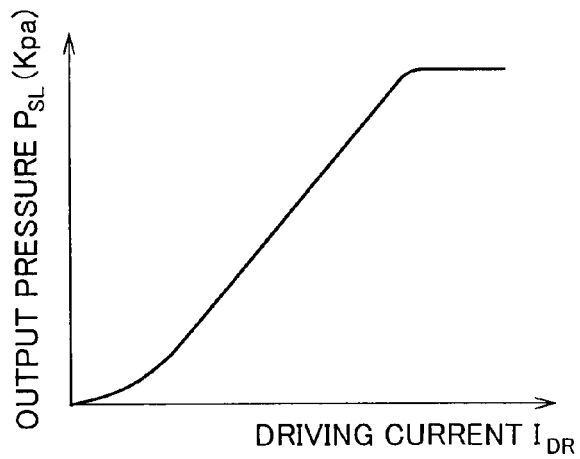
FIG. 7 is the graph illustrating an example of the valve characteristic curve of the linear solenoid valve in FIG. 6.
Figure 11:
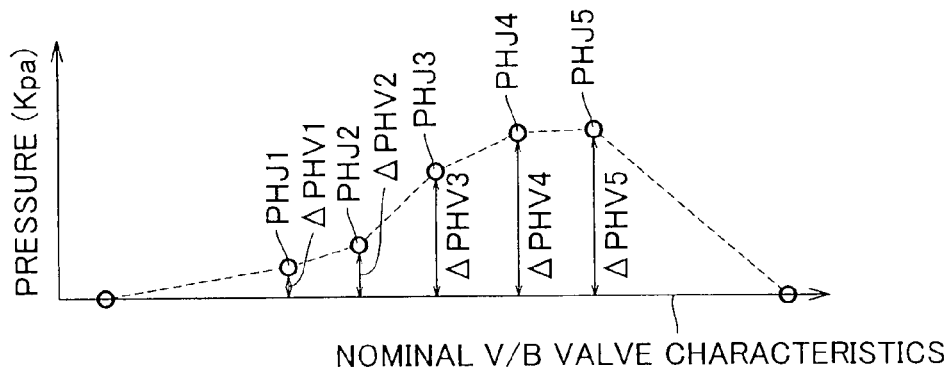
FIG. 11 is the graph for describing the differences calculated in S2 in FIG. 9.

In step S2, the output pressure differences $\Delta PHV1$ to $\Delta PHV5$ and the output pressure differences $\Delta PLV1$ to $\Delta PLV3$ are calculated. The output pressure differences $\Delta PHV1$ to $\Delta PHV5$ and the output pressure differences $\Delta PLV1$ to $\Delta PLV3$ are the differences between the values that are correlated with the multiple magnitudes of test currents along the target fitted-state nominal valve characteristic curve (the nominal V/B valve characteristic curve: $P_{NV/B}(I_{DR})$) derived from the average value of the measured values obtained by actually performing measurements on a predetermined number of, for example, thirty linear solenoid valves, and the actual output pressures PHJ1 to PHJ5 and PLJ1 and PLJ3 corresponding to the multiple magnitudes of test currents, which are measured in step S1. FIG. 11 shows the output pressure differences $\Delta PHV1$ to $\Delta PHV5$ when the higher original pressure is supplied to the linear solenoid valve. In step S3, the fitted-state actual valve characteristic curve (the actual V/B valve characteristic curve: $P_{JV/B}(I_{DR})$) of each of the linear solenoid valves SL1 to SL5 is derived by making a correction to the predetermined nominal valve characteristic curve (the nominal V/B valve characteristic curve) using the output pressure differences $\Delta PHV1$ to $\Delta PHV5$ or the output pressure differences $\Delta PLV1$ to $\Delta PLV3$ and the values interpolated between the successive output pressure differences. The fitted-state actual valve characteristic curve (the actual V/B valve characteristic curve: $P_{JV/B}(I_{DR})$) of each of the linear solenoid valves SL1 to SL5 when the lower original pressure is supplied to the linear solenoid valves SL1 to SL5 is derived in the same manner as described above. The actual valve characteristic curve is a smooth curve, for example, as shown in FIG. 7. In the first embodiment of the invention, steps S2 and S3 correspond to the fitted-state actual valve characteristic curve derivation step.

Next, in step S4, the general (statistical) correlations (for example, the differences or the ratios) between the output pressures and the drive currents $I_{DR}$ are derived for the linear solenoid valves SL1 to SL5, using the multiple actual valve characteristic curves (the actual V/B valve characteristic curves: $P_{JV/B}(I_{DR})$), which are derived in advance when the linear solenoid valves SL1 to SL5 are fitted to the valve body 94, and the target nominal linear valve characteristic curves $P_{NT}(I_{DR})$, which are obtained when valves are in the isolation state and which are stored in advance. In step S5, the actual valve characteristic curves of the linear solenoid valves SL1 to SL5 when the linear solenoid valves SL1 to SL5 are in the isolation state, namely, the estimated linear valve characteristic curves $P_{JT}(I_{DR})$) are derived (estimated) based on the fitted-state actual valve characteristic curves (actual V/B characteristic curves: $P_{JV/B}(I_{DR})$) that are derived when the linear solenoid valves SL1 to SL5 are fitted to the valve body 94, according to the correlations derived in step S4. In the first embodiment of the invention, steps S4 to S5 correspond to the estimated linear valve characteristic estimation step.

In step S6 which is a pseudo-neutral state drive current setting step or the pseudo-neutral state drive current setting device, the piston stroke sensors SS1 to SS5 successively detect the positions to which the pistons C1p, C2p, C3p, C4p, and B1p have been moved when the gradually increasing supply pressures (for example, the air pressures or the hydraulic pressures) are supplied to the hydraulically-driven friction engagement elements C1, C2, C3, C4 and B1 that will be embedded in the predetermined automatic transmission 10. At the same time, the supply pressures are successively detected by the pressure sensors PS1 to PS5. Then, the supply pressures, which are detected when the pistons C1p, C2p, C3p, C4p and B1p reach the predetermined immediately-before-engagement positions that are reached immediately before the hydraulically-driven friction engagement elements C1, C2, C3, C4 and B1 are engaged, are stored. The pseudo-neutral state drive currents Ig are set to the drive currents corresponding to the supply pressures that are detected when it is determined that the pistons C1p, C2p, C3p, C4p and B1p have reached the immediately-before-engagement positions, based on the correlations between the supply pressures (engagement pressures) supplied to the hydraulically-driven friction engagement elements and the drive currents when the linear solenoid valves, which supply the supply pressures to the hydraulic friction engagement elements, are fitted to the valve body 94. The pseudo-neutral state drive currents Ig are the drive current values at which the supply pressures are maintained at the constantly-maintained pressures that are achieved when the pistons C1p, C2p, C3p, C4p, and B1p have been moved to the piston ends and immediately before the hydraulically-driven friction engagement elements C1, C2, C3, 4 and B1 are engaged. As the immediately-before-engagement positions, the reference positions are used. The reference positions are obtained in advance and used to determine whether the positions, which are reached by the pistons C1p, C2p, C3p, C4p, and B1p after being moved to the piston ends or the positions, at which pressing of the pistons C1p, C2p, C3p, C4p, and B1p is started, are within tolerance limits in the step before the hydraulically-driven friction engagement elements are assembled.

Next, in step S7 which is an estimated linear piston-end pressure calculation step or the estimated linear piston-end pressure calculation device, the pseudo-neutral state hydraulic pressures based on the estimated linear valve characteristic curves, namely, the estimated linear piston-end pressures $P_{LEL}(Ig)$ are calculated based on the pseudo-neutral state drive currents Ig derived in step S6, using the actual valve characteristic curves of the linear solenoid valves in the isolation state estimated in step S5, namely, the estimated linear valve characteristic curves PJT $(I_{DR})$.

In step S8 which is a constantly-maintained pressure correction value calculation step or the constantly-maintained pressure correction value calculation device, the differences $(P_{LEL}(Ig) - P_{PEN})$ between the estimated linear piston-end pressures $P_{LEL}(Ig)$ estimated in step S7 and the nominal pressures $P_{LEL}(Ig)$ estimated in step S7 and the nominal piston-end pressure (nominal pseudo-neutral state hydraulic pressure) $P_{PEN}$ that is set as the target value or the design value in advance are calculated as the constantly-maintained pressure correction values $\Delta P_{PE}$. The constantly-maintained pressure correction values $\Delta P_{PE}$ are calculated according to the following equations. The nominal piston-end pressure (the nominal pseudo-neutral state hydraulic pressure) $P_{PEN}$ corresponds to the command value which is assumed to be in the pseudo-neutral state by the electronic control unit 82 for shifting. $\Delta P_{PE} = P_{LEL}(Ig) - P_{PEN}$ In steps S9 to S13 that correspond to the hydraulic pressure correction value calculation step or the hydraulic pressure correction value calculation device, the hydraulic pressure correction values $\Delta P$ are calculated, according to the following equations, for the multiple plant adjustment correction points PN (N is the number of points, and the unit is Kpa) set in advance within the range of the output pressure according to the control specification of the electronic control unit 82 for shifting. In the following equations, FH ( ) and FL ( ) are the transform functions used to transform the estimated linear pressure to the linear current, and from the linear current to the nominal linear pressures (estimated linear pressure→linear current→nominal linear pressure), which are used when the higher original pressure is supplied to the linear solenoid valves and when the lower original pressure is supplied to the linear solenoid valves, respectively. Namely, when the higher original pressure is supplied to the linear solenoid valves, the hydraulic pressure correction values ΔPH1, ΔPH2, ΔPH3, ΔPH4, and ΔPH5 are calculated for the plant adjustment correction points PH1, PH2, PH3, PH4 and PH5, respectively. When the lower original pressure is supplied to the linear solenoid valves, the hydraulic pressure correction values ΔPL1, ΔPL2, ΔPL3 are calculated for the plant adjustment correction points PL1, PL2, and PL3, respectively. Then, the labels on which the bar codes indicating the correlations R1 to R5 between the plant adjustment correction points PN and the hydraulic pressure correction values ΔP for each of the linear solenoid valves SL1 to SL5, for example, as shown in tables 1 and 2, are output from the display/output unit 216. The plant adjustment correction points PH1, PH2, PH3, PH4 and PH5 when the higher original pressure is supplied to the linear solenoid valves correspond to, for example, 30, 160, 410, 715 and 1012 (Kpa), respectively. The plant adjustment correction points PL1, PL2, and PL3 when the lower original pressure is supplied to the linear solenoid valves correspond to, for example, 30, 160 and 410 (Kpa), respectively. The correlations R1 to R5 show the correlations between the plant adjustment correction points PN indicating the output pressures and the hydraulic pressure correction values ΔP. Alternatively, the correlations R1 to R5 may show the correlations between the drive currents $I_{DR}$, at which the output pressures corresponding to the plant adjustment correction points PN are output, and the drive current correction values $\Delta I_{DR}$ corresponding to the hydraulic pressure correction values ΔP.

On the right sides of the following equations for calculating the hydraulic pressure correction values ΔP, which are used in steps S9 to, S13, the first nominal linear pressures (1) are subtracted from the second nominal linear pressures (2) indicated by the transform functions FH ( ) or FL ( ) in the first term (S13). The second nominal linear pressures (2) are calculated so as to correspond to the second drive currents (2) (S12), calculated based on the estimated linear valve characteristic curves (S11). Based on the estimated linear valve characteristic curves, the pressures corresponding to the second drive currents (2) are equal to the required linear pressures which are calculated by adding the constantly-maintained pressure correction values $\Delta P_{PE}$ to the first nominal linear pressures (1) (S10). The first nominal linear pressures (1) are calculated for the respective first drive currents (1) (S9). In step S10, the constant maintenance correction values $\Delta P_{PE}$ are added to the first nominal linear pressures (1) that exceed a predetermined value, for example, 30 kPa, that may contribute to occurrence of shift shock.

TABLE 1

| Plant adjustment correction points when higher original pressure is supplied | PH1 | PH2 | PH3 | PH4 | PH5 |
|---|---|---|---|---|---|
| Hydraulic pressure correction | ΔPH1 | ΔPH2 | ΔPH3 | ΔPH4 | ΔPH5 |

TABLE 1-continued values

ΔPH1 = FH (P1) − P1
ΔPH2 = FH (P2 + $\Delta P_{PE}$) − P2
ΔPH3 = FH (P3 + $\Delta P_{PE}$) − Pe
ΔPH4 = FH (P4 + $\Delta P_{PE}$) − P4
ΔPH5 = FH (PH5 + $\Delta P_{PE}$) − P5

TABLE 2

| Plant adjustment correction points when lower original pressure is supplied | PL1 | PL2 | PL3 |
|---|---|---|---|
| Hydraulic pressure correction values | ΔPL1 | ΔPL2 | ΔPL3 |

ΔPL1 = FL (PL) − P1
ΔPL2 = FL (P2 + $\Delta P_{PE}$) − P2
ΔPL3 = FL (P3 + $\Delta P_{PE}$) − P3

The label, on which the bar codes indicating the correlations between the plant adjustment correction value PN and the hydraulic pressure correction values ΔP are printed, is placed on each automatic transmission 10. Thus, in the vehicle assembly plant, the input device 81 of the electronic control unit (ECU) 82 for shifting provided in the vehicle body in which the automatic transmission 10 is mounted reads the bar codes printed on the label, and the correlations R are stored in the electronic control unit (ECU) 82 for shifting that controls the automatic transmission 10. The drive current correction device 152 of the electronic control unit 82 corrects the control command values used to correct the hydraulic pressure values or the drive current values corresponding to the hydraulic pressure values, using the correlations R1 to R5 between the output hydraulic pressures $P_{SL1}$ to $P_{SL5}$ output from the linear solenoid valves SL1 to SL5 (or the drive currents $I_{DR1}$ to $I_{DR5}$ corresponding to the output hydraulic pressures $P_{SL1}$ to $P_{SL5}$) and the hydraulic pressure correction values $\Delta P_{SL1}$ to $\Delta P_{SL5}$ (or the drive current correction values $\Delta I_{DR1}$ to $\Delta I_{DR5}$ corresponding to the hydraulic pressure correction values $\Delta P_{SL1}$ to $\Delta P_{SL5}$). The drive current correction device 152 then outputs the drive currents $I_{DR1}$ to $I_{DR5}$.

As described above, the adjustment method for the linear solenoid valves SL1 to SL5 of the automatic transmission 10 according to the first embodiment of the invention includes (a) the estimation step (S1 to S5) in which the valve characteristics of the linear solenoid valves SL1 to SL5 when the linear solenoid valves SL1 to SL5 are fitted to the hydraulic control circuit 84 are measured, and the estimated linear valve characteristic curves of the linear solenoid valves SL1 to SL5 in the isolation state are estimated based on the measured valve characteristics using the correlations derived in advance (S1 to S5); and (b) the correction value output step (S6 to S13) in which the estimated linear piston-end pressures $P_{LEL}$ (Ig) immediately before the hydraulically-driven friction engagement elements are engaged are calculated based on the estimated linear valve characteristic curves, and the correction values that are applied to the control command values to correct the drive currents supplied from the electronic control unit (valve control unit) 82 to the linear solenoid valves SL1 to SL5 are calculated based on the differences ($P_{LEL}$ (Ig)−$P_{PEN}$) between the estimated linear piston-end pressures $P_{LEL}$ (Ig) and the nominal piston-end pressures $P_{PEN}$, and then output. Accordingly, corrections are made to compensate for not only the variations in the valve characteristics of the linear solenoid valves SL1 to SL5 but also the variations in the engagement/disengagement characteristics of the multiple hydraulically-driven friction engagement elements C1, C2, C3, C4 and B1 that are controlled by the linear solenoid valves SL1 to SL5, respectively. Therefore, the torques that are transferred when the hydraulically-driven friction engagement elements C1, C2, C3 C4 and B1 are engaged are controlled accurately, and the shift shock caused in the automatic transmission 10 is appropriately suppressed regardless of the variations in the engagement/disengagement characteristics of the hydraulically-driven friction engagement elements C1, C2, C3, C4 and B1.

In the adjustment method for the linear solenoid valves SL1 to SL5 of the automatic transmission 10 according to the first embodiment of the invention, the estimation step (S1 to S5) includes (a) the measurement step (S1) in which the output pressures, output from the linear solenoid valves SL1 to SL5 when the predetermined multiple magnitudes of test drive currents are supplied to each of the linear solenoid valves SL1 to SL5 while the linear solenoid valves SL1 to SL5 are fitted to the hydraulic control circuit 84, are measured; (b) the fitted-state actual valve characteristic curve derivation step (S2, S3) in which the differences $\Delta PHV1$ to $\Delta PHV5$ and $\Delta PHV1$ to $\Delta PHV5$ between the output pressures output from the linear solenoid valves SL1 to SL5, fitted to the hydraulic control circuit 84, which are measured in the measurement step (S1) and the pressure values correlated with the multiple test drive current values along the predetermined fitted-state nominal valve characteristic curve (the nominal V/B valve characteristic curve: $P_{NV/B}(I_{DR})$) are calculated, and the fitted-state actual valve characteristic curves (the actual V/B valve characteristic curves: $_{PJV/B}(I_{DR})$) of the linear solenoid valves SL1 to SL5 are derived by making corrections to the fitted-state nominal valve characteristic curve using the differences; and (c) the estimated linear valve characteristic curve derivation step (S4, S5) in which the estimated linear valve characteristic curves $P_{JT}(I_{DR})$ of the linear solenoid valves SL1 to SL5 in the isolation state are derived based on the fitted-state actual valve characteristic curves of the linear solenoid valves SL1 to SL5, using the general correlations (for example, the differences or ratios) between the output pressures based on the fitted-state nominal valve characteristic curves and the output pressures based on the predetermined isolation-state nominal linear valve characteristic curves. Accordingly, corrections are made to compensate for the variations in the valve characteristics of the linear solenoid valves SL1 to SL5, the variations including the variations caused by fitting the linear solenoid valves SL1 to SL5 to the hydraulic control circuit 84.

In the adjustment method for the linear solenoid valves SL1 to SL5 of the automatic transmission 10 according to the first embodiment of the invention, the correction value output step (S6 to S13) includes (a) the estimated linear piston-end pressure calculation step (S7) in which the estimated linear piston-end pressures $P_{LEL}(Ig)$ immediately before the hydraulically-driven friction engagement elements C1, C2, C3, C4 and B1 are engaged are calculated based on the estimated linear valve characteristic curves $P_{JT}(I_{DR})$; (b) the constantly-maintained pressure correction value calculation step (S8) in which the constantly-maintained pressure correction values $\Delta P_{PE}$ are calculated based on the differences ($P_{LEL}(Ig) - P_{PEN}$) between the estimated linear piston-end pressures $P_{LEL}(Ig)$ and the predetermined nominal piston-end pressure $P_{PEN}$; and (c) the hydraulic pressure correction value calculation step (S9 to S13) in which the hydraulic pressure correction values are calculated based on the constantly-maintained pressure correction values $\Delta PPE$ so that the correlations between the drive currents and the effective pressures exhibit the nominal characteristic. Then, (d) the hydraulic pressure correction values calculated in the correction value calculation step are output in the form that can be used by the electronic control unit 82 that controls the automatic transmission 10. Accordingly, corrections are made to compensate for the variations in the engagement/disengagement characteristics of the hydraulically-driven friction engagement elements.

The adjustment method for the linear solenoid valves SL1 to SL5 of the automatic transmission 10 according to the first embodiment of the invention includes (a) the required linear pressure calculation step (S10) in which multiple first nominal linear pressures are set as the lattice points of the correction values applied to the control command values, and the required linear pressures are calculated by making corrections to the first nominal linear pressures using the constantly-maintained pressure correction values. Then, (b) the drive currents required to achieve the required linear pressures are set based on the estimated linear valve characteristic curves, and the required control command values are calculated as the second nominal linear pressures based on the isolation-state nominal linear valve characteristic curves using the drive currents, and the hydraulic pressure correction values that are the differences between the first nominal linear pressures and the second nominal linear pressures are calculated for the multiple lattice points set in advance. Accordingly, the hydraulic pressure correction values appropriate for the final processing portions in which the control command values are converted into the drive current command values are calculated, and the final processing portions are corrected. Thus, the effects of the corrections are obtained in all the shift controls in which the hydraulically-driven friction engagement elements are involved.

The adjustment method for the linear solenoid valves SL1 to SL5 of the automatic transmission 10 according to the first embodiment of the invention includes (a) the pseudo-neutral state drive current setting step (S6) in which the pseudo-neutral state drive currents are set to the drive currents supplied to the linear solenoid valves SL1 to SL5 to bring the hydraulically-driven friction engagement element into the immediately-before-engagement state. In (b) the estimated linear piston-end pressure calculation step (S7), the estimated linear piston-end pressures $P_{LEL}(Ig)$ at the pseudo-neutral state drive currents are calculated based on the estimated linear valve characteristic curves $P_{JT}(I_{DR})$. Accordingly, the pseudo-neutral state drive currents that are the drive currents supplied to the linear solenoid valves SL1 to SL5 immediately before the hydraulically-driven friction engagement elements are engaged are appropriately obtained.

According to the adjustment method for the linear solenoid valves SL1 to SL5 of the automatic transmission 10 according to the first embodiment of the invention, in the pseudo-neutral state drive current setting step (S6), the fact that the pistons C1p, C2p, C3p, C4p and B1p of the hydraulically-driven friction engagement elements C1, C2, C3, C4 and B1 have reached the predetermined immediately-before-engagement positions are detected, and the pseudo-neutral state drive currents are set to the drive currents corresponding to the detected positions based on the correlations between the hydraulic pressures and the drive currents according to the fitted-state actual valve characteristic curves of the linear solenoid valves of the hydraulically-driven friction engagement elements, which are obtained in advance. Accordingly, the pseudo-neutral state drive currents that are the drive currents supplied to the linear solenoid valves SL1 to SL5 immediately before the hydraulically-driven friction engagement elements are engaged are appropriately obtained by detecting the positions to which the pistons have been moved. It is not necessary to obtain the drive currents supplied to the linear solenoid valves SL1 to SL5 when engagement of the hydraulically-driven friction engagement elements is actually started.

Next, a second embodiment of the invention will be described. The same portions as those in the first embodiment will be denoted by the same reference numerals, and the descriptions thereof will not be provided below.

Figure 13:
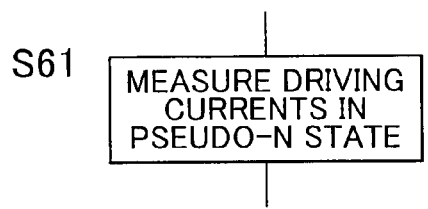
FIG. 13 is the view showing a part of the flowchart according to a second embodiment of the invention, that is, step S61 executed instead of S6 in FIG. 10.

FIG. 13 shows step S61 used instead of step S6 in FIG. 10. Step S61 according to the second embodiment of the invention is executed when the hydraulically-driven friction engagement elements C1, C2, C3, C4 and B1 are fitted within the automatic transmission 10. In order to gradually engage a predetermined hydraulically-driven friction engagement element when one hydraulically-driven friction engagement element from among the hydraulically-driven friction engagement elements C1, C2, C3, C4 and B1 provided in the automatic transmission 10 is fully engaged, the drive current supplied to the linear solenoid valve corresponding to the predetermined hydraulically-driven friction engagement element is gradually increased. At this time, the pseudo-neutral state drive current Ig is set to the drive current supplied to the linear solenoid valve that supplies the engagement pressure to the hydraulically-driven friction engagement element when the difference between the input rotational speed and the output rotational speed of the torque converter 32 of the automatic transmission 10 is equal to or greater than 70 rpm or the speed ratio "e" of the output rotational speed to the input rotational speed of the torque converter 32 is equal to or lower than 0.96. According to the second embodiment of the invention, the pseudo-neutral state drive currents are accurately set based on the drive currents detected when engagement of the hydraulically-driven friction engagement elements is started in the state where the hydraulically-driven friction engagement element are actually embedded in the automatic transmission 10.

Some of the hydraulically-driven friction engagement elements C1, C2, C3, C4 and B1 contribute to selections of multiple gears. For example, the clutch C2 contributes to selections of fifth gear to eighth gear. Accordingly, when the pseudo-neutral state drive current Ig is set, the gear at which the ratio of the torque transferred by the clutch C2 to the torque input in the automatic transmission 10 is the smallest, for example, fifth gear is used. Thus, the torque transferred by the clutch C2 is small and the start of engagement is accurately detected due to a small torque change. Accordingly, the pseudo-neutral state drive current Ig is accurately set.

Although the first and second embodiments of the invention are described so far with reference to the accompanying drawings, the invention may be realized in various other embodiments.

For example, the automatic transmission 10 according to the embodiments described above has eight forward gears. Alternatively, the automatic transmission may have other numbers of forward gears, for example, four forward hears, five forward gears, or six forward gears. Also, the automatic transmission 10 may be used in either a FF (front engine front drive) vehicle or a FR vehicle (front engine rear drive).

In the embodiments of the invention described above, the correction values and the correlations R used to control the output pressures output from the linear solenoid valves SL1 to SL5 that control the hydraulically-driven friction engagement elements C1, C2, C3, C4 and B1 are derived. Alternatively, the correction values and the correlations R used to control the output pressures output from only the linear solenoid valves that need to accurately control the hydraulically-driven friction engagement elements may be derived. Also, the correction value and the correlations R for the linear solenoid valve SL6 that controls the hydraulically-driven friction engagement element B2 may be derived.

In the embodiments of the invention described above, the correction values and the correlations R used to control the output pressures output from the linear solenoid valves SL1 to SL5 that control the hydraulically-driven friction engagement elements C1, C2, C3, C4, and B1 in each of the case where the lower original pressure is supplied to the solenoid valves SL1 to SL5 and the case where the higher original pressure is supplied to the solenoid valves SL1 to SL5 are calculated. Alternatively, the correction values and the correlations R in one of the case where the lower original pressure is supplied to the solenoid valves SL1 to SL5 and the case the higher original pressure is supplied to the solenoid valves SL1 to SL5 may be calculated.

The routine in FIG. 10 according to the first embodiment of the invention includes step S4 in which the general (statistical) correlations (for example, the differences or the ratios) between the output pressures and the drive currents $I_{DR}$ are derived using the multiple actual valve characteristic curves (the actual V/B valve characteristic curves: $P_{JV/B}(I_{DR})$ when the linear solenoid valves are fitted to the valve body, which are obtained using the valve body test holes (test connection holes) and the target nominal linear valve characteristic curves $P_{NT}(I_{DR})$ in the isolation state that are stored in advance. Alternatively, the routine may be periodically executed at intervals longer than those at which the routine in FIG. 10 is executed, or the predetermined constant correlation set in advance may be used. In such cases, step S4 may be omitted.

In the embodiments of the invention described above, the readable one-dimensional bar codes or the readable two-dimensional bar codes are output. Alternatively, the information may be stored in the RFID (radio frequency identification) label or the like and output. Also, the information may be output via the communication line to be stored in the server.

In the first embodiment of the invention illustrated in FIG. 9, the hydraulic control device 102 is provided. Alternatively, the line pressure adjustment mechanism which is one of the functions for which the valve body 94 may be used, and the electronic control unit 98 may control a pilot linear valve for controlling the line-pressure.

In the embodiments of the invention described above, the linear solenoid valves SL1 to SL6 are operated in the predetermined manner, and the correlations R are derived based on the output pressures PSL1 to PLS6 output from the linear solenoid valves SL1 to SL6 and the positions to which the pistons of the clutches C and the brakes B have been moved. Alternatively, the measurement step may be executed on the valve body 94 and the clutches C independently of each other, the information may be stored in the database, and the correction values may be finally calculated.

In step S6 according to the first embodiment of the invention, the supply pressures when the pistons C1p, C2p, C3p, C4p and B10 have reached the predetermined immediately-before-engagement positions are stored. Alternatively, the pistons C1p, C2p, C3p, C4p and B1p may be moved to piston ends, and the points at which the curves indicating the correlations between the piston operation amounts and the supply pressures are bent are stored, and the piston-end pressures may be set based on these points.

In step S6 according to the first embodiment of the invention, the pseudo-neutral state drive currents Ig are set to the drive currents corresponding to the supply pressures when it is determined that the pistons have reached the immediatelybefore-engagement positions. Alternatively, the pseudo-neutral state drive currents Ig may be obtained, based on the estimated linear characteristic curves, using the values obtained by adding the pressure differences between the predetermined nominal piston-end pressures and the measured piston-end pressures to the predetermined nominal pseudo-state hydraulic pressures.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the scope of the invention.

What is claimed is:

1. An adjustment method for a vehicle automatic transmission that is provided with a hydraulic control circuit including linear solenoid valves which control supply pressures that are supplied to hydraulically-driven friction engagement elements; and a valve control unit that outputs drive currents to drive the linear solenoid valves, the adjustment method being used to calculate correction values that are applied to control command values used to adjust the drive currents so that correlations between the drive currents and effective pressures exhibit nominal characteristics, comprising:
    measuring valve characteristics of the linear solenoid valves when the linear solenoid valves are fitted to the hydraulic control circuit, and estimating linear valve characteristics of the linear solenoid valves in isolation state based on the measured valve characteristics using predetermined correlations;
    calculating estimated linear piston-end pressures of the hydraulically-driven friction engagement elements immediately before the hydraulically-driven friction engagement elements are engaged based on the estimated linear valve characteristics, and calculating the correction values that are applied to the control command values to adjust the drive currents supplied from the valve control unit to the linear solenoid valves based on differences between the estimated linear piston-end pressures and nominal piston-end pressures; and
    outputting the calculated correction values, wherein:
        the estimated linear piston-end pressures are calculated immediately before the hydraulically-driven friction engagement elements are engaged based on the estimated linear valve characteristics;
        constantly-maintained pressure correction values are calculated based on the differences between the estimated linear piston-end pressures and the predetermined nominal piston-end pressures;
        hydraulic pressure correction values that are applied to the control command values are calculated based on the constantly-maintained pressure correction values so that the correlations between the drive currents and the effective pressures exhibit the nominal characteristics;
        the calculation of the hydraulic pressure correction value comprises calculating multiple first nominal linear pressures set as lattice points of the correction values applied to the control command values, and calculating required linear pressures by making corrections to the first nominal linear pressures using the constantly-maintained pressure correction values;
        the calculated hydraulic pressure correction values are output in a form that is used by an electronic control unit which controls the automatic transmission; and
        the drive currents required to achieve the required linear pressures are determined based on the estimated linear valve characteristics, the required control command values are calculated as second nominal linear pressures based on the isolated-state nominal linear pressure characteristics using the drive currents, and the hydraulic pressure correction values, which are pressure differences between the first nominal linear pressures and the second nominal linear pressures, are calculated for the predetermined lattice points.

2. The adjustment method according to claim 1, wherein measuring valve characteristic comprises:
    measuring fitted-state output pressures, which are output from the linear solenoid valves when the linear solenoid valves are driven at predetermined multiple magnitudes of test drive current values while the linear solenoid valves are fitted to the hydraulic control circuit;
    calculating a fitted state actual valve characteristic in which differences between the fitted-state output pressures output from the linear solenoid valves, which are measured in the measurement step, and pressures correlated with the multiple magnitudes of drive current values based on predetermined fitted-state nominal valve characteristics are calculated, and fitted-state actual valve characteristics of the linear solenoid valves are derived based on the differences and the fitted-state nominal valve characteristics; and
    deriving estimated linear valve characteristics of the linear solenoid valves in the isolation state based on the fitted-state actual valve characteristics of the linear solenoid valves, using predetermined general correlations between the output pressures based on the fitted-state nominal valve characteristics and output pressures based on predetermined isolated-state nominal linear valve characteristics.

3. The adjustment method according to claim 2, wherein, while calculating required linear pressure, the corrections are made to the first nominal linear pressures which are equal to or higher than a predetermined value, from among all the first nominal linear pressures, using the constantly-maintained pressure correction values.

4. The adjustment method according to claim 2, further comprising:
    setting pseudo-neutral state drive currents to the drive currents supplied to the linear solenoid valves when the linear solenoid valves bring the hydraulically-driven friction engagement elements in a state immediately before the hydraulically-driven friction engagement elements are engaged,
    wherein, while calculating estimated linear piston-end pressure, the estimated linear piston-end pressures at the pseudo-neutral state drive currents are calculated based on the estimated linear valve characteristics.

5. The adjustment method according to claim 4, wherein, while setting the pseudo-neutral state drive current, the pistons of the hydraulically-driven friction engagement elements have reached predetermined positions that are reached immediately before the hydraulically-driven friction engagement elements are engaged are detected, and the pseudo-neutral state drive currents are set to the drive currents corresponding to the supply pressures that are supplied to the hydraulically-driven friction engagement elements when the pistons have reached the predetermined positions are detected based on the predetermined correlations between the hydraulic pressures and the drive currents based on the fitted-state actual valve characteristics of the linear solenoid valves corresponding to hydraulically-driven friction engagement elements.

6. The adjustment method according to claim 4, wherein, while setting pseudo-neutral state drive current, the pseudo-neutral state drive currents are set to the drive currents supplied to the linear solenoid valves that supply engagement pressures to the hydraulically-driven friction engagement elements when a difference between an input rotational speed and an output rotational speed of a torque converter of the automatic transmission is equal to or greater than a predetermined value or a ratio of the output rotational speed to the input rotational speed of the torque converter is equal to or lower than a predetermined value while the hydraulically-driven friction engagement elements of the automatic transmission are operated to be gradually engaged.

7. The adjustment method according to claim 6, wherein the hydraulically-driven friction engagement element for setting the pseudo-neutral state drive currents contributes to selections of multiple gears of the automatic transmission, and
while setting pseudo-neutral state drive current, the hydraulically-driven friction engagement element is operated to be engaged at gear at which a ratio of a torque transferred by the hydraulically-driven friction engagement elements to a torque input in the automatic transmission is smallest among multiple gears.

8. The adjustment method according to claim 1, wherein, while calculating the required linear pressure calculation, the corrections are made to the first nominal linear pressures which are equal to or higher than a predetermined value, from among all the first nominal linear pressures, using the constantly-maintained pressure correction values.

9. The adjustment method according to claim 1, further comprising:
setting pseudo-neutral state drive currents to the drive currents supplied to the linear solenoid valves when the linear solenoid valves bring the hydraulically-driven friction engagement elements in a state immediately before the hydraulically-driven friction engagement elements are engaged,
wherein, while calculating the estimated linear piston-end, pressures at the pseudo-neutral state drive currents are calculated based on the estimated linear valve characteristics.

10. The adjustment method according to claim 9, wherein, while setting the pseudo-neutral state drive current, pistons of the hydraulically-driven friction engagement elements have reached predetermined positions that are reached immediately before the hydraulically-driven friction engagement elements are engaged are detected, and the pseudo-neutral state drive currents are set to the drive currents corresponding to the supply pressures that are supplied to the hydraulically-driven friction engagement elements when the pistons have reached the predetermined positions are detected based on the predetermined correlations between the hydraulic pressures and the drive currents based on the fitted-state actual valve characteristics of the linear solenoid valves corresponding to hydraulically-driven friction engagement elements.

11. The adjustment method according to claim 9, wherein, while setting the pseudo-neutral state drive current, the pseudo-neutral state drive currents are set to the drive currents supplied to the linear solenoid valves that supply engagement pressures to the hydraulically-driven friction engagement elements when a difference between an input rotational speed and an output rotational speed of a torque converter of the automatic transmission is equal to or greater than a predetermined value or a ratio of the output rotational speed to the input rotational speed of the torque converter is equal to or lower than a predetermined value while the hydraulically-driven friction engagement elements of the automatic transmission are operated to be gradually engaged.

12. The adjustment method according to claim 11, wherein the hydraulically-driven friction engagement element for setting the pseudo-neutral state drive currents contributes to selections of multiple gears of the automatic transmission, and
while setting the pseudo-neutral state drive current, the hydraulically-driven friction engagement element is operated to be engaged at gear at which a ratio of a torque transferred by the hydraulically-driven friction engagement elements to a torque input in the automatic transmission is smallest among multiple gears.

* * * * *